United States Patent
Carroll

(10) Patent No.: US 10,417,489 B2
(45) Date of Patent: Sep. 17, 2019

(54) ALIGNING GRID LINES OF A TABLE IN AN IMAGE OF A FILLED-OUT PAPER FORM WITH GRID LINES OF A REFERENCE TABLE IN AN IMAGE OF A TEMPLATE OF THE FILLED-OUT PAPER FORM

(71) Applicant: Captricity, Inc., Oakland, CA (US)

(72) Inventor: Robert Carroll, Berkeley, CA (US)

(73) Assignee: Captricity, Inc., Oakland, CA (US)

(*) Notice: Subject to any disclaimer, the term of this patent is extended or adjusted under 35 U.S.C. 154(b) by 44 days.

(21) Appl. No.: 15/354,881

(22) Filed: Nov. 17, 2016

(65) Prior Publication Data

US 2017/0147552 A1 May 25, 2017

Related U.S. Application Data

(60) Provisional application No. 62/257,573, filed on Nov. 19, 2015.

(51) Int. Cl.
| | |
|---|---|
| *G06K 9/00* | (2006.01) |
| *G06K 9/46* | (2006.01) |
| *G06K 9/62* | (2006.01) |
| *H04N 1/387* | (2006.01) |

(52) U.S. Cl.
CPC ....... *G06K 9/00449* (2013.01); *G06K 9/4604* (2013.01); *G06K 9/6203* (2013.01); *H04N 1/3873* (2013.01)

(58) Field of Classification Search
CPC ............ G06F 17/243; G06F 17/248; G06K 9/00449; G06K 9/4604; G06K 9/6203; H04N 1/3873
USPC ................ 715/221, 222, 223, 224, 225, 226
See application file for complete search history.

(56) References Cited

U.S. PATENT DOCUMENTS

| | | | | | |
|---|---|---|---|---|---|
| 5,293,429 | A | * | 3/1994 | Pizano | G06K 9/00442 382/202 |
| 5,394,487 | A | * | 2/1995 | Burger | G06K 9/2054 382/209 |
| 5,852,676 | A | * | 12/1998 | Lazar | G06K 9/00456 382/138 |
| 6,778,703 | B1 | * | 8/2004 | Zlotnick | G06K 9/00449 382/218 |
| 6,886,136 | B1 | * | 4/2005 | Zlotnick | G06K 9/00 358/462 |
| 7,487,438 | B1 | * | 2/2009 | Withers | G06K 9/00449 382/151 |

(Continued)

*Primary Examiner* — Cesar B Paula
*Assistant Examiner* — Yahao Chen
(74) *Attorney, Agent, or Firm* — Perkins Coie LLP

(57) ABSTRACT

Methods, apparatuses, and embodiments related to aligning an image of a table of a form with an image of a table of a template of the form. Automatically extracting data entered in fields of a table of a form by a user can be aided by matching the form with a template of the form. The form template can have a digitized representation that identifies locations of fields of the form, and that identifies labels of the fields. Matching the form with the form template can enable locations and labels of fields of the form to be identified based on the digitized representation. However, matching the form with the form template may require matching the table of the form with the table of the form template, and matching two tables can be challenging. For example, the tables can be rotated, warped, scaled, etc. relative to each other.

5 Claims, 22 Drawing Sheets

(56) References Cited

U.S. PATENT DOCUMENTS

| | | | | |
|---|---|---|---|---|
| 8,885,951 | B1* | 11/2014 | Cristofano | G06K 9/00449 382/173 |
| 2002/0146170 | A1* | 10/2002 | Rom | G06K 9/00469 382/175 |
| 2005/0069179 | A1* | 3/2005 | Hwang | G06K 9/0008 382/124 |
| 2005/0196074 | A1* | 9/2005 | Deere | G06K 9/2054 382/305 |
| 2005/0232513 | A1* | 10/2005 | Ritt | G06T 7/30 382/294 |
| 2005/0289182 | A1* | 12/2005 | Pandian | G06K 9/00442 |
| 2006/0215224 | A1* | 9/2006 | Matsumoto | H04N 1/2179 358/1.18 |
| 2007/0065011 | A1* | 3/2007 | Schiehlen | G06K 9/00469 382/181 |
| 2007/0168382 | A1* | 7/2007 | Tillberg | G06F 17/30253 |
| 2009/0074303 | A1* | 3/2009 | Filimonova | G06K 9/00449 382/224 |
| 2010/0195915 | A1* | 8/2010 | Ueno | G06K 9/00771 382/202 |
| 2010/0246958 | A1* | 9/2010 | Ma | G06K 9/00456 382/176 |
| 2011/0141301 | A1* | 6/2011 | Raghoebardajal | G06T 11/203 348/222.1 |
| 2013/0031145 | A1* | 1/2013 | Luo | G06F 17/30876 707/812 |
| 2014/0003717 | A1* | 1/2014 | Brito | G06K 9/00449 382/170 |
| 2014/0050409 | A1* | 2/2014 | Constantinou | G06K 9/6202 382/195 |
| 2014/0072219 | A1* | 3/2014 | Tian | G06K 9/346 382/171 |
| 2014/0219540 | A1* | 8/2014 | Drichel | G06K 9/3275 382/137 |
| 2014/0334731 | A1* | 11/2014 | Tripathi | G06K 9/726 382/186 |
| 2015/0169951 | A1* | 6/2015 | Khintsitskiy | G06K 9/00483 382/182 |
| 2015/0205777 | A1* | 7/2015 | Campanelli | G06F 17/243 715/226 |
| 2015/0278593 | A1* | 10/2015 | Panferov | G06K 9/00483 382/182 |
| 2016/0012311 | A1* | 1/2016 | Romanik | G06K 9/6203 382/201 |
| 2016/0012594 | A1* | 1/2016 | Romanik | G06T 7/73 382/203 |
| 2016/0012595 | A1* | 1/2016 | Romanik | G06T 7/73 382/203 |
| 2016/0092423 | A1* | 3/2016 | Wilczek | G06F 17/243 715/223 |
| 2016/0104042 | A1* | 4/2016 | Romanik | G06T 7/33 382/103 |
| 2016/0180504 | A1* | 6/2016 | Kounavis | G06T 5/002 348/241 |
| 2016/0253788 | A1* | 9/2016 | Lee | G06T 5/002 382/262 |
| 2016/0371246 | A1* | 12/2016 | Deepak | G06F 17/248 |
| 2017/0351913 | A1* | 12/2017 | Chen | G06K 9/00449 |
| 2018/0091733 | A1* | 3/2018 | Fasen | H04N 5/23229 |

* cited by examiner

Registration Form

Child's Name: _____ Child's Social Security #: _____

Address: _____ Apt.# ____ City _____ State: ____

Zip Code: _____ Home Telephone: _____

Date of Birth: _____ Place of Birth: _____
Birth Certificate Number: _____

Immunization Dates: Polio ____ ____ ____ DPT ____ ____ ____ Varicella ____
HIB ____ ____ ____ HepB ____ ____ MMR ____
If Baptized: Date: _____ Church _____
Church Address: _____

Name of School or Pre-School Child Now Attends: _____
Address: _____ Telephone: _____

FATHER: Name _____ Date/Place of Birth _____
Soc.Sec.# _____ Occupation _____ Work Tel. _____
Company Name/Address _____

MOTHER: Name _____ Date/Place of Birth _____
Soc.Sec.# _____ Occupation _____ Work Tel. _____
Company Name/Address _____

Parents are: __ married __ single __ separated __ divorced

EMERGENCY NOTIFICATION: If parents cannot be reached, notify:
Name _____ Tel.# _____ Relation to child: _____

OTHER CHILDREN IN FAMILY. Please list name and date of birth of brothers/sisters, if any: _____

I HEREBY GIVE MY RELEASE AND CONSENT, IN CASE OF AN EMERGENCY, FOR MY CHILD TO BE TREATED BY A DOCTOR OR HOSPITAL EMERGENCY ROOM, IF I CANNOT BE REACHED AT HOME OR AT WORK.
Date: _____ Parent Signature _____

Child's Current Grade: ____ Principal Approval: _____ Date: _____

DMV

VERIFICATION OF VEHICLE
NOT TO BE COMPLETED BY APPLICANT

This form must be completed in full by an authorized DMV representative, California licensed vehicle verifier, authorized auto club, or peace officer who has been properly trained to perform vehicle verifications.

WARNING: Alterations or erasures will void this form. Your vehicle may also be subject to verification by the California Highway Patrol.

| LICENSE PLATES ON VEHICLE | | LICENSE PLATE NUMBER | STATE | EXP. DATE |
|---|---|---|---|---|
| ☐ None  ☐ Dealer  ☐ Temporary Permit ▶ | | | | |

| VEHICLE IDENTIFICATION NUMBER (VIN) | | | | |
|---|---|---|---|---|
| | | MAKE | BODY TYPE | MODEL YEAR |
| ENGINE NUMBER (MOTORCYCLES ONLY) | | MODEL OR SERIES | | |
| | MOTIVE POWER (FUEL) | EST. WEIGHT (TRAILERS) | | |
| AXLES | | | NUMBER OF WHEELS | FOR CAMP/COACH |
| | | | | LENGTH _____ WIDTH _____ |

| Diagnosis | New Cases | Follow-up | Referrals | Deaths PHU | Deaths Community | Total |
|---|---|---|---|---|---|---|
| Malaria | | | | | | |
| Anaemia | | | | | | |
| All others | | | | | | |
| Diarrhoea With Blood (Dysentery) | | | | | | |
| Yellow Fever | | | | | | |
| Wounds/Trauma | | | | | | |
| Tetanus | | | | | | |
| Lassa Fever | | | | | | |
| Measles | | | | | | |
| Etc. etc. | | | | | | |

FIG. 7

| Samples | pH Meter | Red Cabbage extract | Bromothymol Blue | Bromophenol Blue | Phenolphthalein | pH Paper |
|---|---|---|---|---|---|---|
| Sodium Carbonate Na2CO3 | | | | | | |
| Sodium bicarbonate NaHCO3 | | | | | | |
| Milk of Magnesia Mg(OH)2 | | | | | | |
| Milk | | | | | | |
| Acetic acid (vinegar) CH3COOH | | | | | | |
| Lemon Juice | | | | | | |

| Samples | pH Indicators | | | | | |
|---|---|---|---|---|---|---|
| | pH Meter | Red Cabbage extract | Bromothymol Blue | Bromophenol Blue | Phenolphthalein | pH Paper |
| Sodium Carbonate Na2CO3 | | | | | | |
| Sodium bicarbonate NaHCO3 | | | | | | |
| Milk of Magnesia Mg(OH)2 | | | | | | |
| Milk | | | | | | |
| Acetic acid (vinegar) CH3COOH | | | | | | |
| Lemon Juice | | | | | | |

FIG. 8D

| | pH Meter | Red Cabbage extract | Bromothymol Blue | Bromophenol Blue | Phenolphthalein | pH Paper |
|---|---|---|---|---|---|---|
| Sodium Carbonate Na2CO3 | | | | | | |
| Sodium bicarbonate NaHCO3 | | | | | | |
| Milk of Magnesia Mg(OH)2 | | | | | | |
| Milk | | | | | | |
| Acetic acid (vinegar) CH3COOH | | | | | | |
| Lemon Juice | | | | | | |

ALIGNING GRID LINES OF A TABLE IN AN IMAGE OF A FILLED-OUT PAPER FORM WITH GRID LINES OF A REFERENCE TABLE IN AN IMAGE OF A TEMPLATE OF THE FILLED-OUT PAPER FORM

CROSS-REFERENCE TO RELATED APPLICATIONS

This is a non-provisional application filed under 37 C.F.R. § 1.53(b), claiming priority under U.S.C. Section 119(e) to U.S. Provisional Patent Application Ser. No. 62/257,573 filed Nov. 19, 2015, the entire disclosure of which is hereby expressly incorporated by reference in its entirety.

BACKGROUND

Filling out paper forms is a part of life. A trip to a doctor's office, to the department of motor vehicles (DMV), to an office of a potential new employer, etc., often involves filling out a paper form. Such forms have fields for people to provide information, such as a field for a person's name, another for his address, yet another for his phone number, etc. The forms can also include a table, and the fields that people fill in can be fields in the table. An employee of the doctor, the DMV, etc. often electronically captures the information entered on the form by manually entering the information into a computer. Once electronically captured, the information can be added to a database, a spreadsheet, an electronic document, etc., where the information can be stored for future reference.

BRIEF DESCRIPTION OF THE DRAWINGS

One or more embodiments are illustrated by way of example in the figures of the accompanying drawings, in which like references indicate similar elements.

FIG. 3 is an illustration of a blank school registration form, consistent with various embodiments.

FIGS. 4A and 4B are illustrations of a Department of Motor Vehicles (DMV) form, consistent with various embodiments.

FIG. 5 is an illustration of a blank DMV form, consistent with various embodiments.

FIG. 7 in an illustration of a disease data table, consistent with various embodiments.

FIG. 8A is an illustration of a template pH Indicator table, consistent with various embodiments.

FIG. 8B is an illustration of a first image of a pH Indicator data table where the first image is shrunken relative to the template pH indicator table, consistent with various embodiments.

FIG. 8D is an illustration of a third image of a pH Indicator data table where the third instance is warped, consistent with various embodiments.

DETAILED DESCRIPTION

Figure 1A:
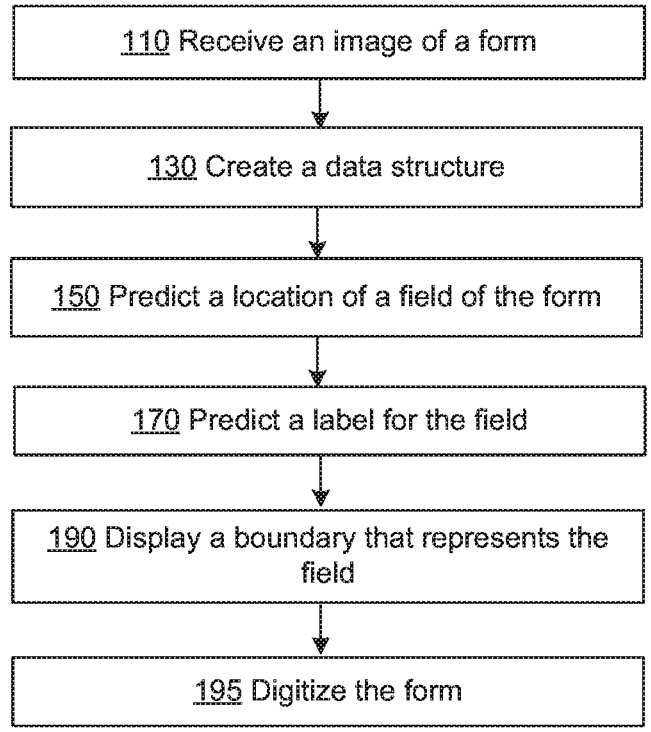
FIGS. 1A-D are flow diagrams that illustrate an example process for identifying a field on a form template based on an image of the form template, consistent with various embodiments.
Figure 1B:
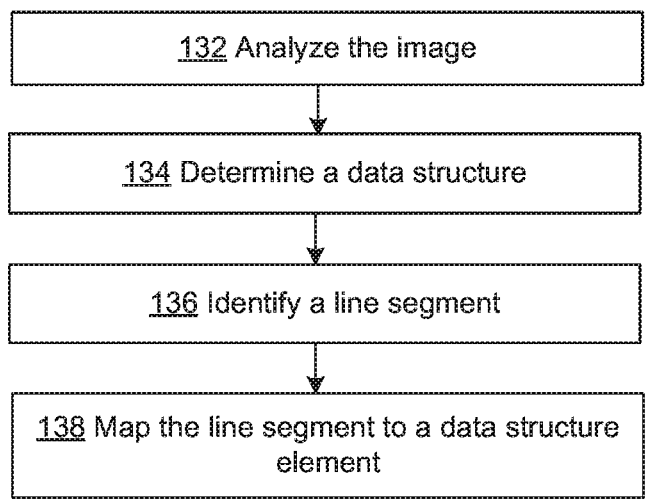
Figure 1C:
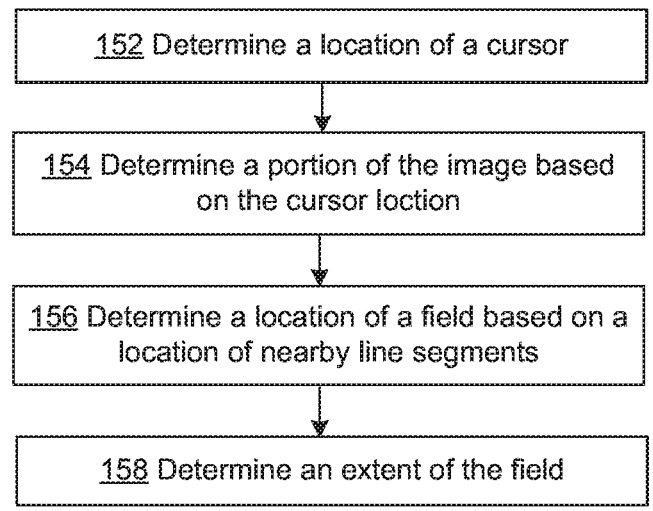
Figure 1D:
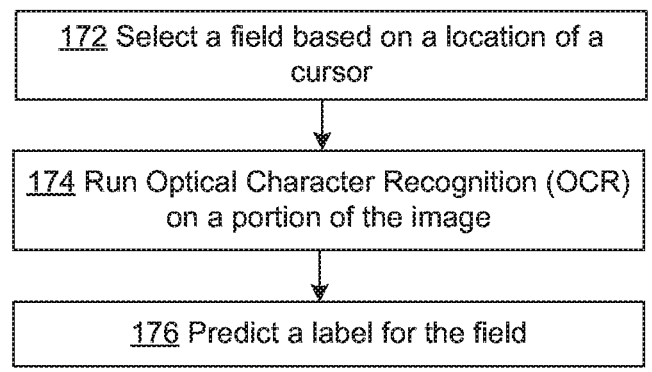

Introduced here is technology related to automatically aligning images of two tables, such as aligning a table of an image of a form with a corresponding table of an image of a template of the form. A form is a piece of material, such as a piece of paper, plastic, fabric, cardboard, etc., on which data/information/graphics/etc. that defines the form is printed, written, etc. For example, a form can be a piece of paper which on which a client intake questionnaire for a doctor's office is printed, can be a piece of paper on which an information data sheet for the Department of Motor Vehicles (DMV) is printed, can be a piece of plastic for an overhead projector on which a teacher draws a table for gathering student preferences for a field trip, can be a cardboard box for a cereal on which a contest entry sheet is printed, etc.

The data/information/graphics/etc. that defines a form can be applied in any of various ways to the piece of material of the form, such as by being manually written on the piece of material, by being printed on the piece of material, etc. When the data/information/graphics/etc. of a form is printed on a piece of material, the data/information/graphics/etc. can be printed by running an application program, such as a word processor or a spreadsheet program (among others), opening a source file which contains the data/information/graphics/etc., and printing the data/information/graphics/etc. on the material. For example, a person can execute a word processor application, can enter data/information/graphics/etc. that defines a particular questionnaire using the word processor, and can write the data/information/graphics/etc. to a source file for the word processor. Anyone else with access to the source file can open the source file using the word processor application, and can print the data/information/graphics/etc. on a piece of paper, turning the piece of paper into a form that contains the particular questionnaire.

The form can include graphics, such as boxes, tables, lines, etc., that help define fields where information can be entered by users of the form.

A field is a space on a form where an item of information can be entered by a person filling out the form, such as by being written or typed in the field. A field can be in any of various configurations. For example, a field can be a stand-alone field, can be one of multiple fields, can be a field in an array of fields of a table, etc. A field can contain information related to identification of the field, such as the name or label of the field, among others. For example, a field can include identifying information, such as a text string that identifies a particular field, a text string that identifies a row or column of a table, etc. For example, a field can include a label that identifies all the fields in a first row of a table as being in row 1. Examples of field labels include a name field, an address field, a driver's license number field, a social security number field, a comment field, a symptom description field, a date field, a signature field, a row one column one field in a table, a row two column five field in a table, etc.

After a person fills out a form, which entails entering data/information in the various fields, the data/information often needs be to captured and electronically stored, such as in a database, spreadsheet, electronic document, etc. In many cases, people, such as office staff, read the filled-out forms and manually enter the data/information of the form in a computer, where the information is electronically captured and stored. It is desirable to automate the work that these office workers perform, and to automatically extract and electronically store the data/information from a filled-out form.

A company, office, or other organization or group may have a number of different forms. In order to automatically extract information from a particular form, it may be helpful to identify a form of the multiple different forms of which the particular form is an instance. In order to accomplish such an identification, it can be useful to generate a library of templates of the various different forms. If a library of form templates includes form templates where the fields of the form templates have been pre-identified, this pre-identification of the fields can be used to help automate or accelerate extraction and recognition of the data entered by users in these fields.

A template of a form, also referred to herein as a form template, is a version of a form that is used as a reference, such as for a comparison to an image of a selected form to determine whether the selected form is an instance of the form template. A form template can be in any of various forms or formats from which an image of the form template can be generated. For example, a form template can be a piece of material, such as a piece of paper, plastic, fabric, cardboard, etc., on which data/information/graphics/etc. that defines the form template is printed, written, etc. In such a case, an image of the form template can be generated by taking a photo of the form template, by scanning the form template, etc. Additionally, a form template can be a source file from which an image of the form template can be generated by use of an application program that is compatible with the source file. In such a case, the application program can open the source file, and can generate an image of the form template. In an example, a form template is stored in a source file for a word processor. A user executes the word processor application, accesses the source file, and uses the application program to generate an image of the form template, such as by generating a JPEG (Joint Photographic Expert Group) file, TIFF (Tagged Image File Format) file, etc.

A worker, such as an Information Technology person at a doctor's office, can generate a library of images of form templates and can pre-identify fields of the form templates. The worker can generate images of the various form templates in various ways, such as by scanning a first form template when the first form template is a piece of material, by taking a photo of a second form template when the second form template is a piece of material, by running a word processor application to open and generate an image of a third form template when the third form template is a source file for the word processing application, etc. In addition to generating the images of the form templates, the worker can identify fields of the various form templates. For example, the worker can draw a rectangle that identifies the location of a first field of a form template, and can label the first field as the "NAME" field. The worker can similarly draw a rectangle that identifies the location of a second field of the form template, and can label the second field as the "ADDRESS" field. The worker can continue this process until he identifies all of the fields of the various form templates.

When an image of a selected form is received, such as an image of a form completed by a user, a computer can compare the image of the selected form to images of form templates from the form template library. When the image of the selected form matches an image of a particular form template, the selected form can be identified as an instance of the particular form template. Once the image of the selected form is matched to the image of the particular form template, the pre-identified fields of the particular form template can be used to extract data from the fields of the selected form.

In an example, a computer compares an image of a filled-out DMV form with various images of form templates from a library of images of form templates of the DMV. The computer matches the image of the filled-out form with an image of a form template from the library of DMV form templates. The match can be based on a comparison of the entire form, or just a portion or portions of the form. The various fields of the DMV form template, such as the NAME field and the ADDRESS field, have been pre-identified and are stored with the library of DMV forms. The computer uses the pre-identified field data of the form template to identify the location of the NAME and ADDRESS fields in the image of the filled-out DMV form, extracts the data entered by the user in those fields, and uses optical character recognition (OCR) to recognize text entered by a user in those fields. The computer further uses the pre-identified labels of the fields to store the extracted text in a database. The computer stores the text string from the NAME field in a NAME database entry associated with the filled-out instance of the DMV form, and stores the text string from the ADDRESS field in an ADDRESS database entry associated with the filled-out instance of the DMV form.

In another example, a worker obtains an image of a form template by scanning or taking a photo of the form template. A form template is preferably a form that is blank (i.e., not filled out by a user), but in some embodiments can also be a version of the form that has been filled out by a user. The worker views the image of the form template using a computer. The worker uses a mouse to enter a first box that defines the bounds of a first field on the image, uses the mouse to enter a second box that defines the bounds of a second field on the image, etc. The "bounds" or "boundary" of a field is one way to define the "location" of the field. The worker next provides an identity/label for each box. For example, the worker selects the first box using the mouse, and enters "NAME" using a keyboard, thereby identifying/labeling the first box as the "NAME" field. The worker next selects the second box and enters "PHONE NUMBER", thereby identifying/labeling the second box as the "PHONE NUMBER" field.

The form template of the example also includes a ten by ten data table. The worker one by one identifies boxes that represent the boundary/location of each of the one hundred fields of the data table, and types in the identity/label of each of the fields. For example, the worker identifies the row one column one field box and types "R1C1" to identify the field as the row 1 column 1 field. Once all of the fields of the form have been located and identified, the worker, using the computer, creates a digitized representation of the form template, which includes the locations and identities of all of the fields.

Once the digitized representation of the form template has been created, information entered by a user in the various fields of a completed form can be automatically extracted from an image of the completed version of the form. In this example, a computer obtains an image of a completed form that was generated by scanning or taking a photo of the completed form. The computer matches and aligns the image with an image or a portion(s) of an image from a library of form templates. Once the image is matched with the image or the portion(s) of the image of the form template, the pre-identified locations and identities of the various fields of the form template can be used to locate corresponding fields on the completed form. For example, (X,Y) coordinates of the "name" field box, or the "R1C1" field box, can be used to locate an area on the completed form where a person's name or the row one column one table data is expected to appear.

In order to match an image of a form that includes a table with an image of a form template that includes a table, the image of the table of the form may need to be aligned with the image of the table of the form template. Aligning two images of a form or a table can be challenging for a number of reasons. When two images of a form or a table are obtained, the two images can be at a different scale, a different rotation, etc., relative to each other, or can be offset relative to each other. Further, either or both of the two images can be warped or otherwise disfigured. For example, an image of a form can be warped or otherwise disfigured when the image is captured by a camera or other image acquiring device that was oriented at an angle relative to the form, or if the paper on which the form is printed was bent or otherwise deformed when the image was captured.

In a first alignment example, a table has regularly spaced horizontal and vertical grid lines, where the grid lines define the table. When aligning two instances of such a table, such as a first instance that is an image of a table of a completed form, and a second instance that is an image of the corresponding table of the form template, the first instance can be moved relative to the second instance in order to cause the grid lines to align. As the first instance of the table is moved relative to the second instance in an attempt to align the two instances, many of the grid lines can match even though the instances are not properly aligned.

In an example in which a 10×10 table has eleven vertical grid lines that are all equally spaced (forming ten fields in a horizontal row of the table), as a first instance of the table is swept from left to right across a second instance, the right-most vertical grid line of the first instance first aligns with the left-most vertical grid line of the second instance. Then, after the first instance moves one grid line space further to the right, the two right-most vertical grid lines of the first instance align the with two left-most vertical grid lines of the second instance, etc. As the first instance continues to move from left to right relative to the second instance, more and more of the vertical grid lines align, until finally all eleven vertical grid lines align. As the sweep continues, the vertical grid lines continue to periodically align, with one less pair of vertical grid lines aligning each time the first instance moves right by a grid space. One of the challenges to properly aligning the two instances of the table is to distinguish between the many incorrect vertical grid alignments between the two tables and the one correct vertical grid alignment.

In a second alignment example, two instances of a form, which include a table, are at different scales. For example, a first instance can be an image of the form at a 90% scale, and a second instance can be an image of the form at full scale. In general, examples that include two instances of a form can also be representative of an example that includes an image of a form, and an image of a template of the form. The second instance can be an image of a template of the form. In this example, this scaling, or shrinking, results in the X and Y dimensions or pixel counts of the table of the first instance being 90% of the X and Y dimensions or pixel counts of the table of the second instance. Another one of the challenges to properly aligning the two instances is to scale the first instance or the second instance to bring the two instances back to a same scale. Scaling the first instance or the second instance can include scaling both instances.

In a third alignment example, two instances of a form are at different orientations. For example, a first instance may be an image of the form at a first orientation, and a second instance may be an image of the form at a second orientation. The first orientation differs from the second orientation by a rotation angle of ten degrees in this example. Rotating the first instance or the second instance to bring the two instances back to a same orientation is another one of the challenges to properly aligning the two instances of the table.

In a fourth alignment example, one or both instances of a form are warped. In an example, both a first instance and a second instance of a form are warped. When an image is warped, lines that were straight in the source of the image do not appear as being straight in the image. De-warping the first instance and the second instance is yet another one of the challenged to properly aligning the two instances of the table.

After two instances of a form are aligned and fields of the two instances are correlated, OCR can be run on the areas of the form that correlate to the field boundaries, and the person's name, the row one column one table data, etc. can be automatically extracted based on the OCR results. For example, the boundary of a field can be oversized by a predetermined amount, and OCR can be run on the area of the form that overlaps with the oversized boundary box to determine text that appears within the oversized boundary box.

Further, when the digitized representation of the form template includes an identity or label of each field, text entered in each field can be automatically stored in a proper location in a database entry. For example, a database entry can be created for a particular completed form. Referring to the example above, a person entered "John Doe" in the "name" field, and "2.0" in the "R1C1" field of this particular completed form. An OCR of the "name" and "R1C1" fields of this particular completed form determined that the text in these field is, respectively, "John Doe" and "2.0". The computer system writes "John Doe" to the "name" field, and "2.0" to the "R1C1" field, of the database entry for this particular completed form.

In a second example that advantageously utilizes some techniques disclosed in this application, a user similarly obtains an image of a form template by scanning or taking a photo of the form template. The form template is preferably blank, but in some embodiments can also be filled out. The user views the image of the form template using a computer. The user moves a cursor to a first field of the form template, and the computer automatically displays a predicted location of the field, including a bounding box that represents the boundary of the field. The computer further predicts the field identity/label based on text in the document. The user clicks on the field to indicate that he wants to digitize the field. In some embodiments, the user can interactively modify the size of the bounding box that represents the extent of the field, and can change the identity/label of the field. Once finalized, the user can cause the field information (e.g., the bounding box coordinate, the bounding box location, the identity/label of the field, etc.) to be written to a database.

The user now wishes to digitize a table of the form template. The user depresses a click/select indicator of a mouse outside one corner of the table and moves the cursor to outside the opposite corner of the table, which causes a table indicator box to be drawn such that the box encloses the table. The computer system predicts the locations of fields of the table, as well as field identities/names/labels for the fields. The user indicates that he wants to digitize the fields of the table. In some embodiments, the user can interactively modify the size of the bounding boxes that represent the extents of the fields of the table, and can change the identity/label of the fields of the table. Once finalized, the user can cause the field information (e.g., the bounding box coordinates, the bounding box locations, the identity/label of the fields, etc.) for fields of the table to be written to a database.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Further, in this description the term "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

FIGS. 1A-D are flow diagrams illustrating an example process for identifying a field of a form template based on an image of the form template, consistent with various embodiments. The process of FIGS. 1A-D can be used to identify fields of a form template in preparation, for example, for generating a library of form templates where the library includes or is associated with digitized representations of the form templates that include locations or identities/labels of fields of the form templates. A digitized representation of a form template that includes locations or identities/labels of fields of the form template can include both locations and identities/labels of the fields of the form template. Identifying a field of a form template can include identifying a location of the field on the form template, or identifying an identity/label of a field of the form template.

At block 110, a computer system receives binary data that represents an image of a form template, such as form template 300 of FIG. 3. The binary data can be created in any compatible manner, such as by scanning the form template, taking a photo of the form template, running an application program to access and generate an image of a form template (e.g., when the form template is a source file), etc. The binary data can be from a scanner, camera, etc. that is coupled to and/or integrated with the computer system, can be from a remote computer system, can be from a mobile device such as a smart phone or tablet, can be from an application program, etc. The remote computer can have a scanner, camera, etc. that is coupled to and/or integrated with the remote computer system, and that can be used to obtain an image of a form template based on a scan or photograph of the form template.

In some embodiments, the image includes meta-data that identifies visual data, such as meta-data that identifies locations of lines, fields in the form template, etc. In other embodiments, the image includes no meta-data that identifies visual data, such as locations of lines, locations and/or extents of fields in the form template, etc. In such embodiments, the process of FIGS. 1A-D advantageously is able to extract visual data from the image without relying on or needing meta-data that identifies or helps to identify the visual data.

At block 130, the computer system creates a data structure to represent the form template. In some embodiments, the data structure is structured to enable efficient location of fields based on interactive user input. In one example usage scenario, a user views an image of a form template during a process of digitizing the form template. When the user moves a cursor over a possible location of a field of the form template, the data structure can be structured to enable a fast and efficient prediction and display of a possible field. Digitizing a form template can include storing data related to fields of a form template, such as locations of fields, boundaries of fields, labels of fields, etc., at a data structure to facilitate automated or semi-automated extraction of data written/typed/etc. at the fields of a filled-out version a form that is an instance of the form template. A label of a field can also be referred to as an identity of the field.

Figure 2:
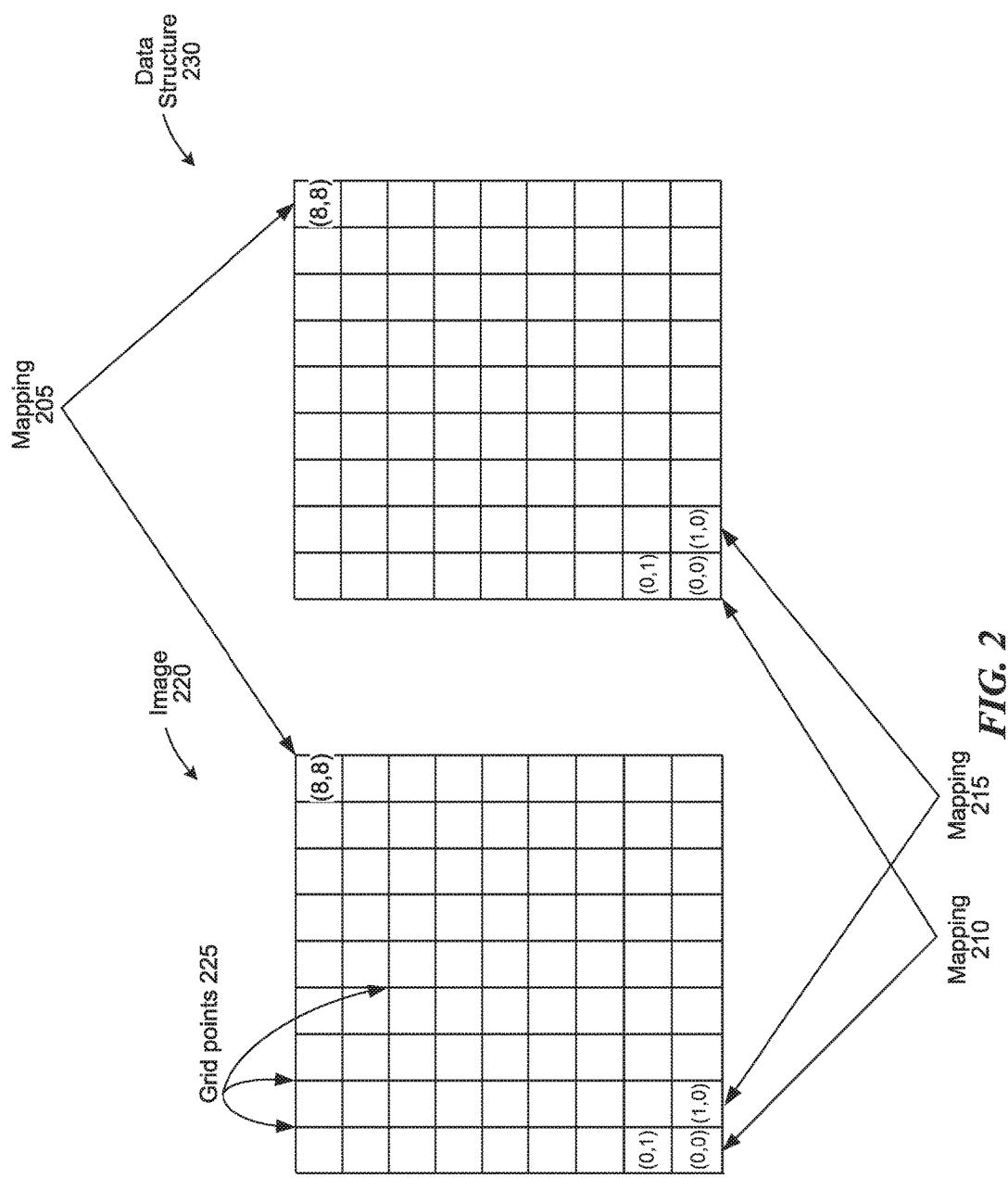
FIG. 2 is diagram that illustrates a mapping between an image of a form template and an associated data structure, consistent with various embodiments.

In some embodiments, the data structure is organized so that adjacent portions of an image map to adjacent elements of a data structure. For example, data structure 230 of FIG. 2 is organized so that adjacent "portions" of image 220 map to adjacent elements of data structure 230. Each square of image 220 represents a "portion" of image 220, and each square of data structure 230 represents an element of data structure 230. Each corner of each square of image 220, such as the square at index (0,0), or the square at index (8,8), is coincident with a grid of image 220. Grid points 225 identifies examples of three grids, also referred to as grid points.

As can be seen at mapping 210 and mapping 215, two adjacent "portions" of image 220 (e.g., portion (0,0) and portion (1,0)) map to adjacent elements of data structure 230 (e.g., element (0,0) and element (1,0)).

Blocks 132-138 represent a flow diagram to perform the operation of block 130. At block 132, the computer system analyzes the image of the form template. Features of a data structure can be determined by a computer system based on the analysis of the image. For example, features of a data structure, such as the number of elements of the data structure, the organization of the data structure, the data associated with each element, etc. can be determined based on an analysis of the image.

In some embodiments, the computer system determines a data structure based on a grid that the computer system determines based on the image of the form template. A grid can define the "portions" of an image. In FIG. 2 for example, grid points of image 220, such as grid points 225, define "portions" of image 220, where each non-overlapping square of image 220 represents one of the "portions" of image 220.

The computer system can determine the size of a grid based on an analysis of the image. For example, a grid can be set based on the size of a pixel of the image (e.g., grid=1 pixel×1 pixel), the size of a grouping of pixels of the image (e.g., grid=3×3 pixels), a measured portion of the image (e.g., grid=0.1 mm×0.1 mm), a percentage of a size of the image (e.g., the X grid=1% of the X dimension of the image, and the Y grid=1% of the Y dimension of the image), etc. When the grid is a pixel, one of the "portions" of image 220 includes data of the pixel that overlaps with one of the squares of image 220. When the grid is group of 3×3 pixels, one of the "portions" of image 220 includes data of the 9 pixels that overlap with one of the squares of image 220. Etc.

While the current discussion focuses on a regular grid whose grid points define squares, a grid can have various characteristics that are determined based on any of various other data. For example, a grid can define a set of non-overlapping rectangles, such as when the grid is 2 pixels by 1 pixel. As another example, the grid can be irregular. For example, the grid of FIG. 7 can be coincident with the line intersections of FIG. 7, where the lines and associated line intersections are irregularly spaced.

The computer system can determine a data structure (block 134) based on results of the analysis of block 132. In some embodiments, the computer system determines the data structure to enable data of each "portion" of the image to map to a different element of the data structure, and to enable adjacent "portions" of the image map to adjacent elements of the data structure. Data structure 230 of FIG. 2 is an example of such a data structure.

The computer system can determine any of various types of data structures, such as a linked list, an array, a hash table, etc. Further, the data structure can be based on any of various attributes of the image, such as the color(s) of the image, the size of the image, the resolution of the image, etc.

In some embodiments, two elements of a data structure are considered to be adjacent when the index of each of the elements differs by one unit. For example, in data structure 230, the index is an ordered pair. For data structure 230, two elements are considered adjacent when one number of the ordered pair differs by one unit, and the other number of the ordered pair is the same. For example, element (0,0) is adjacent to element (1,0) because one number of the ordered pair (the first number in this example) differs by one unit, and the other number of the ordered pair is the same. Similarly, element (0,0) is adjacent to element (0,1) because one number of the ordered pair (the second number in this example) differs by one unit, and the other number of the ordered pair is the same.

As discussed above, the data structure can be organized so that the relative locations of the "portions" of the image are reflected in the organization of the data structure. When a document, such as a form template, is scanned, photographed, etc., the resulting image has a certain resolution. For example, the resolution of the image can be 2048 pixels by 1536 pixels, for a total of 3,145,728 pixels (or 3.1 Megapixels). In some embodiments, the computer system determines the grid size so that the grid matches the size of a pixel. In such an embodiment, each pixel of the image is associated with a particular row and column of the 2048 pixel×1536 pixel image of the form template. In this example, a pixel located at numbered pair (0,0) is located at the bottom-left of the image, and a pixel located at (2047, 1535) is located at the top-right of the photo. As is shown in FIG. 2, adjacent portions (0,0) and (1,0) of image 220 map to adjacent elements (0,0) and (1,0) of data structure 230. When the portion is a pixel, adjacent pixels (0,0) and (1,0) of the image map to adjacent elements (0,0) and (1,0) of the data structure.

At block 136, the computer system identifies a line segment. Some algorithms for predicting fields in a form template use locations of lines on the form template to predict or determine a location of a field, and a boundary of the field. The location of the field is where the field is located on the image of the form template. The location can be any location associated with the field, such as the location of the middle of the field, the bottom left corner of the field, the location of a line that defines a boundary of the field, such as a bottom line of a field, etc. The boundary of the field defines an area on the image where a user is expected to input (e.g., write, type, etc.) a value for the field.

Some embodiments of the process of FIG. 1 are interactive, in that user input is required during the process. In preparation for an interactive session, a computer system can pre-populate a data structure with data derived from an image to be digitized to enable a faster and more efficient interactive user experience. Some embodiments advantageously load data of the form template in memory in preparation for an interactive session. Loading the data of the form template in memory, such as by loading a data structure that contains data of the form template, and organizing the data to efficiently support an interactive session, can enable a much faster and responsive interactive user experience.

Some embodiments of the process of FIG. 1 use locations of line segments of the form template in predicting or determining field locations and boundaries. In order to facilitate an improved interactive user experience, qualifying line segments can be stored in a data structure that is organized/structured to efficiently support an interactive session. Returning to block 126, in some embodiments, the computer system identifies all visible line segments of a form template that meet a certain criteria. The computer system does this by analyzing the binary data of the image of the form template to identify line segments that are visible on the form template. Identifying line segments is well known in the art, with one example of an algorithm for doing so being a Hough Line Transform, which can be found at http://docs.opencv.org/doc/tutorials/imgproc/imgtrans/ hough_lines/hough_lines.html. A second example of a line extractor can be found at http://docs.opencv.org/master/db/d73/classcv_1_1LineSegmentDetector.html.

As line segments are found, they can be evaluated to determine if they meet certain criteria. For example, lines that do not extend a pre-determined distance may be filtered out, lines that do not run sufficiently or substantially straight in the X or Y dimension may be filtered out, lines that are or are not of a certain color or color range may be filtered out, lines that are or are not of a certain style (such as a dashed line) may be filtered out, etc. In some embodiments, a line is deemed to run sufficiently straight when its length in the primary direction in which the line runs is at least 600% of the length that it traverses in the non-primary direction. For example, a line that extends 3 inches in the X dimension may be filtered out if the difference between the maximum and minimum Y coordinates of the line segment is more than 0.5 inches.

In some embodiments, once a line segment is determined and passes all line segment filters, the line segment is mapped to a data structure element (block 138). As discussed above, data of a "portion" of an image that is determined based on a grid can be mapped to an element of a data structure. Once the line segment is determined, the computer system determines which "portions" of the image the line passes through, and maps the line to the elements that are mapped to those "portions." For example, where the grid is a pixel and a line runs through 1000 pixels, the line can be mapped to each of the 1000 pixels. The data stored at each element can include, e.g., a link to a data structure element that includes the data of the line segment, information regarding the portion of the line segment that passes through the portion of the image that maps to the element, etc.

In some embodiments, this process is repeated for all line segments of the form template, such that, once completed, the data structure includes line segment information for all line segments that met the criteria and were not filtered out. Once the process is complete, the data structure of such embodiments includes information regarding all the line segments that meet the criteria, thereby advantageously enabling an enhanced interactive user experience.

At block 150, the computer system predicts a location of a field of the form template. Any computing device, such as a remote computer system, a mobile device, etc. can be used to perform the operation of block 150. A mobile device can be any mobile computing device, such as a laptop computer, a smart phone, a tablet, etc. In some embodiments, the operations of all blocks of FIG. 1 are performed by a computer system. In other embodiments, the operations of blocks 110-138 are performed by a server, and the operations of blocks 150-195 are performed by a computing device, such as a laptop computer, a desktop computer, a smart phone, a tablet, etc. In other embodiments, various computers perform the operations of the various blocks of FIG. 1A-D.

Blocks 152-158 represent a flow diagram to perform the operation of block 150. At block 152, a computer system determines a location of a cursor. In some embodiments, when a user begins an interactive session to digitize a form template, the user views an image of the form template. The image of the form template can be displayed by any of various applications that can display images, such as an image viewer, a photo viewer, a PDF viewer, a web browser, a word processor, etc. The process of digitizing the form template includes identifying relevant fields of the form template that a user may want to automatically extract from a filled-out form that is an instance of the form template. The user guides a cursor over a field, in this example field 305 of FIG. 3.

When the cursor hovers over and/or stays substantially at a selected location on the image, the computer system determines the location of the cursor, such as the location of the cursor on the image. Based on the location of the cursor, the computer system determines a "portion" of the image (block 154). The "portion" of the image can be a portion of the image that is located at the location of the cursor. For example, when the grid of image 300 of FIG. 3 is a pixel and the user hovers a cursor over field 305, the computer system determines the coordinate of the cursor. Based on the coordinate of the cursor, and based on the size of the grid (in this example, a pixel), the computer system determines that the coordinate of the cursor intersects a particular pixel of the image (i.e., the pixel being the "portion" of the image). In various embodiments, the portion of the image that is determined at block 154 can be a grid, multiple grids, part of the image that is within a defined distance the location of the cursor, etc.

At block 156, the computer system determines a location of a field based on a location of nearby line segments, and at block 158 determines an extent of the field. In a first example, a field is encircled by line segments. An example of such a field is field 405 of FIG. 4A, where a user would enter the "MAKE" of an automobile on a DMV form. As discussed above, the location of the field can be any location associated with the field, such as the location of the middle of the field, the bottom left corner of the field, the location of a line that defines a boundary of the field, the location of an extent of the field, etc.

In this example, the location of the field is the location of the line segment at the bottom of the field. Further, the data structure of block 130 is organized so that adjacent portions of an image map to adjacent elements of a data structure to enable a fast and efficient prediction and display of a possible field. In other words, when a first "portion" of the image is located "below" a second "portion" of the image, the element that maps to the first portion will be "below" the element that maps to the second portion. For example, in FIG. 2, the portion of image 220 at index (0,0) is "below" the portion of image 220 at index (0,1). Accordingly, the element of data structure 230 at index (0,0) is also "below" the element at index (0,1).

Based on the cursor location of block 152, and the associated "portion" of the image, the computer system accesses a data structure element associated with the "portion" of the image to determine if the element is mapped to a line segment. In this example, when the element is mapped to a line segment, the location of the line segment is determined and the location of the field is based on the location of this nearby line segment (block 156). The location of the field can be based on or can be any location characteristic of the line segment, such as a coordinate of a predetermined point on the line segment (e.g., the middle, left end, right end, etc. of the line segment), a location of the line segment, a location of the "portion" of the image that maps to the line segment, etc.

When the element is not mapped to a line segment, the computer system begins walking "down" elements of the data structure to find a line segment that is "below" the element. In this example, the index of an element of the data structure has the format index (X,Y). The computer system can walk "down" elements of the structure by decrementing Y. For example, if the starting element has an index of (1000,900), the next element when walking "down" elements of the data structure will have an index of (1000,899). As the computer system walks down elements of the data structure, it determines whether the next lower element maps to a line segment. If not, the computer system continues to the next lower element. Once the computer system identifies an element that maps to a line segment, the computer system in this example determines the location of the line segment and bases the location of the field on the location of this nearby line segment (block 156).

Once the "lower" line segment is identified, the computer system determines an extent of the field (block 158). In this first example, the computer system walks "up" elements of the data structure until it finds a line segment "above" the lower line segment. The computer system then walks "left" and "right" until it finds line segments that are "left" and "right" of the starting element. When the four line segments form a box, the extent of the field is based on the four line segments. For example, the extent of the field can be defined as the box formed by the four line segments, or by taking the box formed by the four line segments and over sizing or under sizing the box to determine the extent and/or boundary of the field.

In a second example, a field is bounded on two or three sides by line segments. Examples of such fields include fields 410 and 415 of FIG. 4A. In such examples, the location of nearby line segments and the location of the field are determined in a manner similar to the first example (block 156). However, when searching in a direction where the field is not bounded by a line, no line is found. When the computer system is in the process of determining the extent of the field (block 158), each discovered bounding line determines an extent of the field in one dimension. The extent of the field in directions where no bounding line was discovered is determined based on the end points of the bounding lines. For fields 410 and 415, the left extent is set to be coincident to the left ends of the top and bottom bounding line segments. For field 415, the right extent is similarly set to be coincident to the right ends of the top and bottom bounding line segments.

In a third example, a field is bounded on one side by a line segment. An example of such a field is field 305 of FIG. 3. In such an example, the location of nearby line segments and the location of the field are determined in a manner similar to the first example (block 156). However, when searching in a direction where the field is not bounded by a line, no line is found in that direction. When determining the extent of such a field (block 156), a computer system can set the left and right ends of the field to be coincident with the left and right ends of the discovered bounding line segment.

The top of the extent of the field can be determined in any of several ways. For example, the height can be determined based on the height of text that is associated with the field. For field 305, the top extent of the field can be set based on the text to the left of the field, "Child's Name," which is the text associated with field 305. The height of the field can be set equal to the height of the associated text, can be set to be a multiple of the height of the associated text (e.g., 1.5 times the height of the associated text), etc. As another example, the height can be determined based on the average or median height of text in the document. For example, the height of the field can be set equal to the median or average height of text in the document, can be set to be a multiple of the median or average height of the text in the document (e.g., 1.5 times the height of the median or average text height), etc.

In a forth example, a field includes extraneous line segments. An example of such a field is field 505 of FIG. 5. Field 505 includes line segments to denote where each character should be placed. In such a case, a detected nearby line segment can be filtered based on certain criteria. The filtering can happen prior to block 156. For example, when the line segments that form the top and bottom extents of field 505 are located, the Y dimension distance between the two line segments can be determined. When searching for line segments in the left or right direction, any detected vertical line segments that have a length less than a predetermined portion of the distance between the top and bottom extent line segments, such as 25% or 50% of the distance, can be filtered. Once the extraneous line segments are filtered, field 505 is determined in a manner similar to field 415.

In a fifth example, a field is bounded on one side by a line segment, and on an opposite side by one or more line segments whose lengths are different than or are offset from the boundary line segment of the first side. Examples of such fields include fields 310 and 315 of FIG. 3. In such cases, where one or more line segments are found in the vertical direction (block 156) which do not match the length and/or do not line up with the bottom line segment (e.g., the upper line segment is the same length, but is shifted in the left or right directions as compared to the bottom line segment), any of various techniques can be used to determine the upper extent of the field (block 158). For example, the upper extent of the field can be determined in a manner similar to the third example where the extent is based on the height of text in the document. As another example, the upper extent of the field can be set to be coincident with the line segment(s) found in the vertical direction, or to be coincident with the lowest line segment found in the vertical direction. When determining whether two line segments have the same length, or are shifted, the comparison between the line segments can include an error threshold, which can be a predetermined absolute amount, can be a predetermined relative amount, etc. For example, the error threshold can be 0.1 inches, can be 10% of the length of the line segment, etc.

In a sixth example, multiple fields are bounded on the top and bottom by line segments that extend the length of the multiple fields, and are not bounded on the left or right. An example of such a field is field 420 of FIG. 4A, which is bounded on the top and bottom by line segments that extend past the fields for APPLICANT'S SIGNATURE, for PRINTED NAME, and for DATE. In such a case, a computer system can determine the left and right extent of each field based on text associated with the fields or by the ends of the top and bottom boundary line segments (block 158). For example, a computer system can determine that multiple text fields are associated with the top and bottom boundary line segments based on spacing between the text. A computer system can evaluate the space between words, and when space between some words associated with a line segment or field exceeds a predetermined threshold, the computer system can determine that the large spacing indicates a new field. The threshold can be an absolute amount (e.g., a spacing more than 0.25 inches in the original image or when printed), can be a relative amount (e.g., a spacing more than two times the height of the text, more than 6 times the median spacing between words, etc.), among other amounts. Line segments 425-440 of FIG. 4B are examples of line segments that represent the left and right extents of the multiple fields of field 420.

In a seventh example, a field is part of a table. Examples of such fields include fields 605 and 620 of table 600 of FIG. 6, and field 705 of table 700 of FIG. 7. In such cases, a table can be automatically or semi-automatically detected. When tables 600 or 700 are automatically detected, a user can place a cursor over a field of the table, such as field 605 or field 705, and a computer system can determine the location of the cursor (block 152). The computer system can determine a portion of the image based on the cursor location (block 154) in a manner similar to some of the above examples. When determining a field based on locations of nearby line segments (block 156), which can be done in a manner similar to the first example where the field is encircled by line segments, a computer system can continue to search in the upper, lower, right, and left directions and can determine, based on the location of detected line segments, that field 605 is part of table 600, or that field 705 is part of table 700. For example, when the computer system searched in the right direction, the computer system can detect a series of similarly sized line segments. By doing similar searches in the left, upper, and lower directions the computer system can detect other line segments of the table in a similar manner, and, based on the detected line segments, can determine a location and extent of the table.

When tables 600 or 700 are semi-automatically or interactively detected, a computer system can receive input from a user that indicates an existence and location of the table. For example, when determining a location of a cursor (block 152), a computer system can also determine that a user drew a box with a mouse or other device to indicate a table. For table 600/700, a user can click slightly below and to the left of the bottom left corner of table 600/700 (e.g., below and to the left of field 615/715), can continue to depress the click indicator while moving the cursor to slightly above and to the right of the top right corner of table 600/700 (e.g., above and to the right of field 610/710), where he releases the click indicator, thereby indicating a first and a second corner of a rectangle that indicates an extent of a table, in this example table 600/700. The computer can analyze line segments that are within the indicated drawn bounding rectangle to determine both the location and extent of table 600/700, as well as the location and extent of each of the fields of the table, such as field 605/705 (blocks 156 and 158). In table 600/700, each field is encircled by line segments, and the location and boundary of field 605/705 can be determined in a manner similar to the first example where a field is encircled by line segments.

In some embodiments, X and Y dimensions of table 600/700 are determined, and lines that run less than a predetermined amount, such as 75% of a table dimension, are filtered. For example, if a line runs in the X dimension less than 75% of the X dimension of the table, or if a line runs in the Y dimension less than 75% of the Y dimension of the table, the line can be filtered out.

At block 170, a computer system predicts a label for the field. Blocks 172-176 represent a flow diagram for performing the operation of block 170. A computer system can select a field based on a location of a cursor on the image of the form template (block 172). The location of the cursor at block 172 can be the same location of the cursor at block 152, or can be a different location, for example, due to the cursor moving slightly. The field can be the field of block 156. The computer system can run OCR on part or all of the image to determine text of the image (block 174). OCR can be run on the contents of a field when a user indicates a selection of the field, can be run on the entire document during creation of a data structure at block 130, or can be run at any of various other times. The contents of the field can be defined by the extent of the field as determined at block 158, by under sizing or over sizing the extent of the field of block 158, e.g., over sizing the extent of the field by 50% of the height of the field, or by another method.

A label for a field can be predicted in any of various ways (block 176). For example, the label can be predicted based on text that is located nearby to or at the field. As an example, prediction of labels for fields 305 and 310 of FIG. 3 can be based on an analysis of text/field patterns in a row of document 300 that includes the field. A computer system can determine that the text CHILD'S NAME is followed by field 305, which is followed by CHILD'S SOCIAL SECURITY #, which is followed by another field. The computer system, based on this pattern of text/field/text/field, can predict that the first text (i.e., CHILD'S NAME) is a label for the first field (i.e., field 305), and that the second text is a label for the second field.

As another example, a prediction of the label for field 315 can be similarly based on an analysis of text/field patterns in a row of document 300. A computer system can determine that the text PARENTS ARE: is followed by a first field, which is followed by MARRIED, which is followed by a second field, which is followed by SINGLE, which is followed by a third field, which is followed by SEPARATED, which is followed by a forth field, which is followed by DIVORCED. In this example, with there being text to both the left and right of each field, the computer system can additionally base a prediction of a label for a field on text punctuation. In this case, based on the first text ending in a colon (i.e., ":"), the computer system can predict that the text that follows each field is the label for the field, and that the label for field 315 is DIVORCED.

Figure 4A:
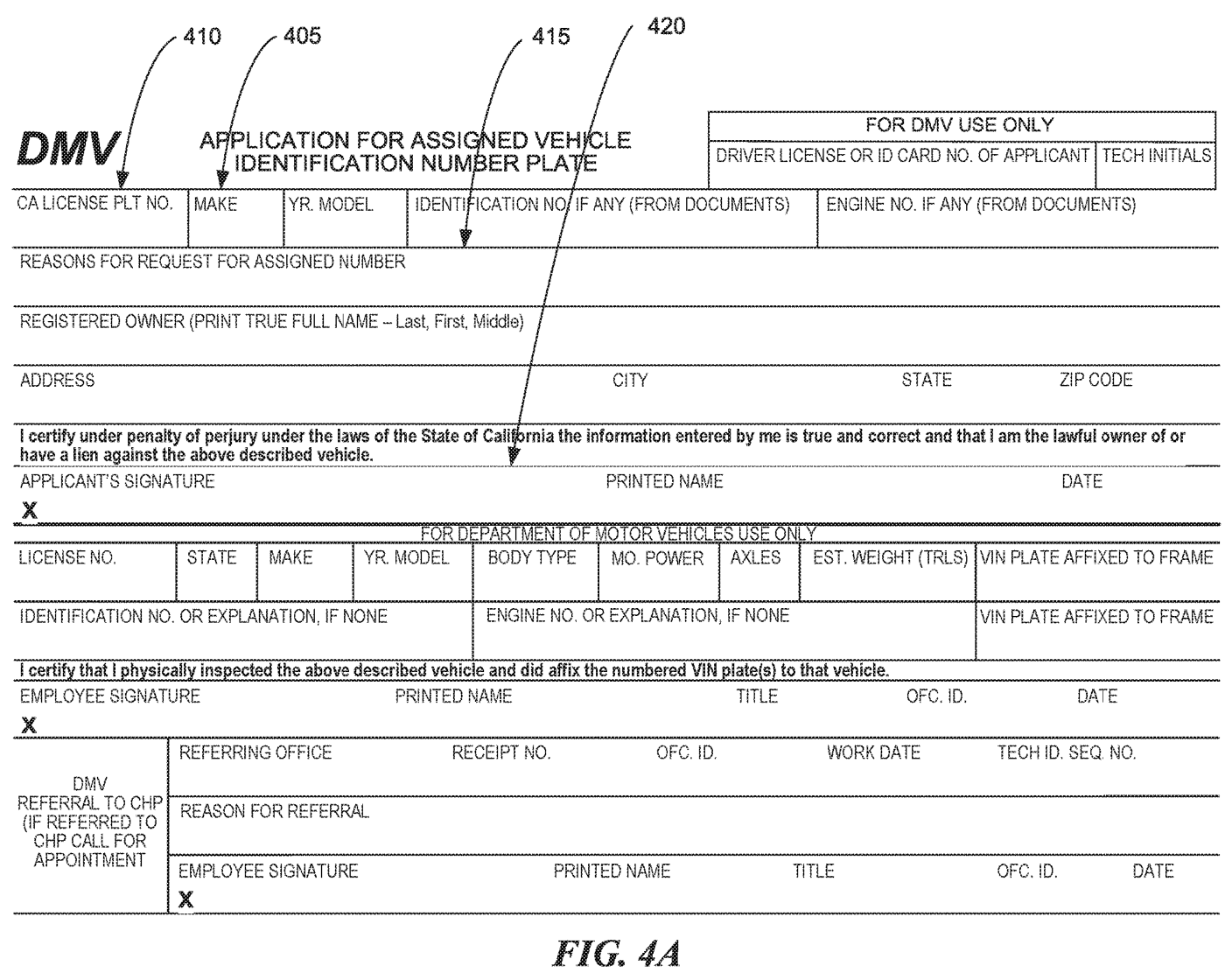
Figure 4B:
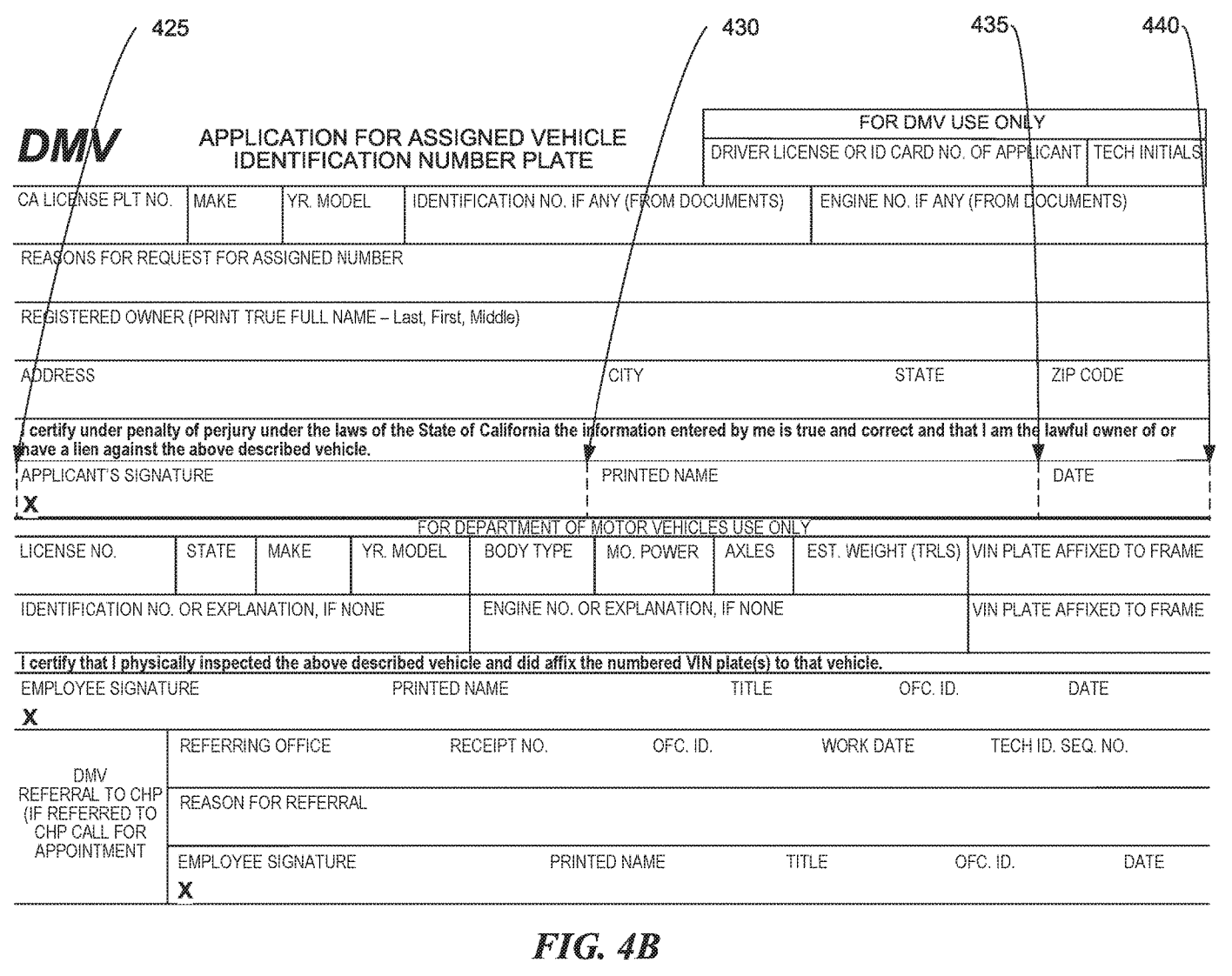

As yet another example, a prediction of the label for field 405 of FIG. 4A can be based on text that is located within the bounds of the field. A computer system can determine that the text MAKE lies within the boundary of field 405, and can predict that MAKE is the label for field 405. The bounds/boundary of the field can be defined by the extent of the field as determined at block 158, by a sizing of the extent of the field of block 158, or by another method. As yet another example, a prediction of a label for field 420 of FIG. 4A can be based on text that is located within the bounds of the multiple fields of field 420, as is represented by line segments 425-440 of FIG. 4B. In this example, a label for the first of the multiple fields of field 420 is APPLICANT'S SIGNATURE, a label for the second of the multiple fields is PRINTED NAME, and a label for the third of the multiple fields is DATE.

Figure 6:
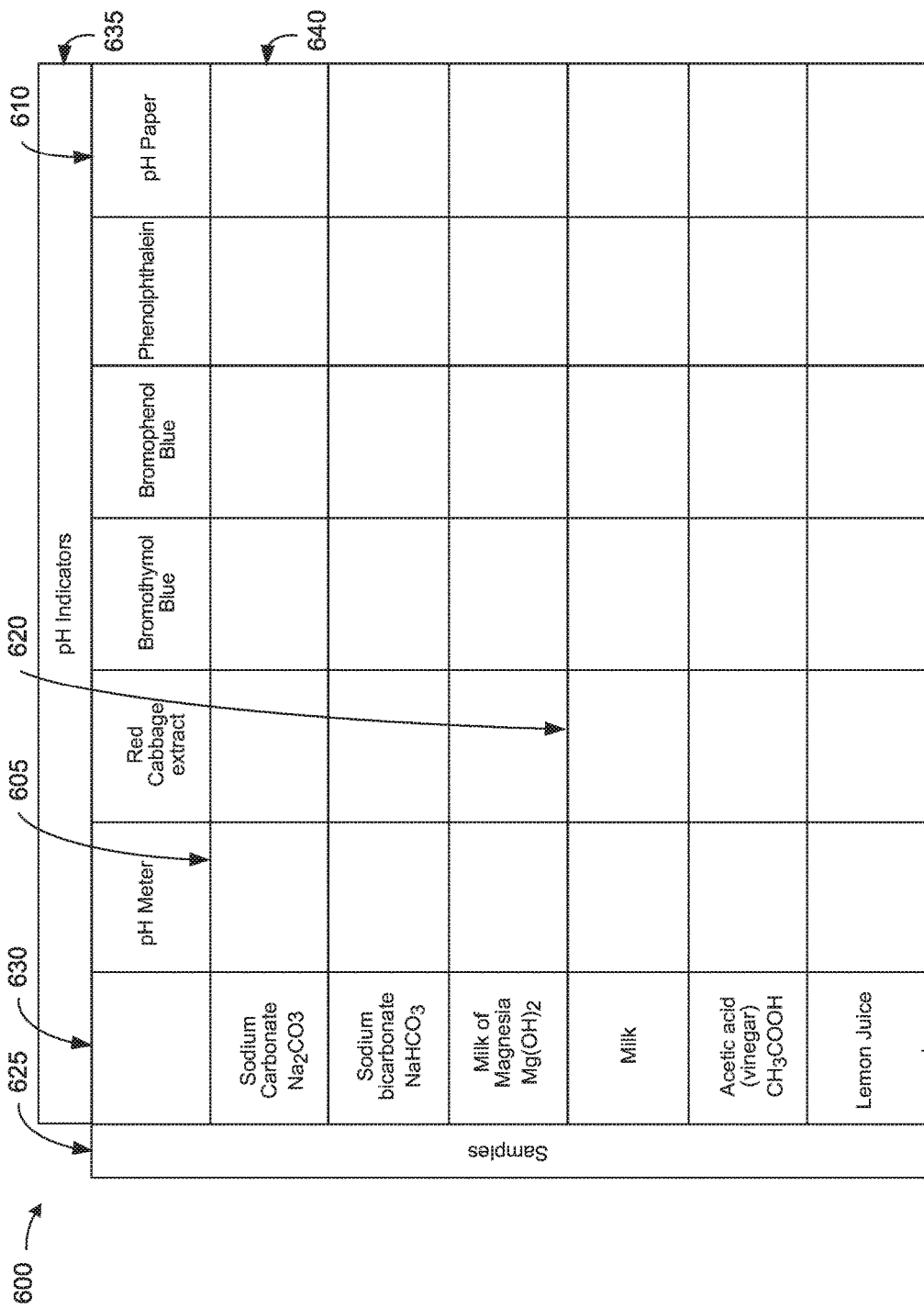
FIG. 6 is an illustration of a pH Indicator table, consistent with various embodiments.

A label for a field in a table, such as fields 605 or 620 of table 600 of FIG. 6, or field 705 of table 700 of FIG. 7, can be based on text in the outermost row(s) and column(s) of the table. In the example of FIG. 6, area 625, which includes the text SAMPLES, and area 635, which includes the text PH INDICATORS, are not part of table 600. The line segments that define the extents of areas 625 and 635 and do not define the extent of table 600 (i.e., the "625/635 line segments"), are not part of table 600 in this example and can be filtered in any of several ways. For example, when a user draws a box using a mouse or other device to indicate a table, the user can draw the box so that it does not include the entirety of areas 625 and 635. A computer system can filter the 625/635 line segments based on their not being fully contained within the drawn box.

In another example, a user draws the box so that it includes all of areas 625 and 635. In this example, a computer system can filter the 625/635 line segments based on the Y-dimension of area 625, and the X-dimension of area 635, not matching the X and Y dimensions of fields of table 600. In other words, the computer system can analyze fields that it finds within the drawn table indication box. When the computer system finds a number of abutting fields that are laid out in a table configuration, it can keep those fields, and it can filter out fields that do not match the table pattern. In this example, the 625/635 line segments that define boundaries of area 625 will be filtered out due to the Y dimension of area 625 not matching the Y dimension of fields of table 600. Additionally, the 625/635 line segments that define boundaries of area 635 will be filtered out due to the X dimension of area 635 not matching the X dimension of fields of table 600. This filtering will leave line segments that form the boundaries of the fields that form the rows and columns of the table.

Contents of fields that are in the outermost row(s) and column(s) can be analyzed to predict labels for the fields of table 600 (block 176). A computer system analyzes table 600 and determines that fields of the left most column and top most row of table 600 include text. The computer system can base the labels of the fields of table 600 on the text found in these fields. For example, a label of field 605 can be set to "PH METER" "SODIUM CARBONATE NA2CO3", with "PH METER" being predicted as part of the label for all fields in column 630 that are below the top most row, and with "SODIUM CARBONATE NA2CO3" being predicted as part of the label for all fields of row 640 to the right of the left most column. As a second example, a label of field 620 can be "RED CABBAGE EXTRACT" "MILK OF MAGNESIA MG(OH)2".

Labels for fields of table 700 are handled in a manner similar to the fields of table 600. In the example of FIG. 7, a label of field 705 can be set to "NEW CASES" "MALARIA", with "NEW CASES" being predicted as part of the label for all fields in column 720 below the top-most row of table 700, and with "SODIUM CARBONATE NA2CO3" being predicted as part of the label for all fields in row 725 to the right of the left most column of table 700.

At block 190, the computer system displays a boundary that represents the field. The boundary can be the extent determined at block 158 of FIG. 1C, can be the extent oversized or undersized by a predetermined amount, etc. For example, the boundary can be determined by oversizing the extent of the field by 0.25 inches, by undersizing the extent of the field by 10% of the height of the extent, etc. The boundary can be displayed in response to the user placing the cursor at a location of the field, by the user hovering the cursor or keeping the cursor substantially still over the field, etc.

At block 195 the user digitizes the form template. Digitizing a form template can include, for example, storing data related to fields of a form template, such as locations of fields, boundaries of fields, labels of fields, etc., at a data structure, such as to facilitate automated or semi-automated extraction of data written/typed/etc. at the fields of a filled-out version of a form that is an instance of the form template. The data structure can be the data structure of block 130, or can be another data structure. For example, the computer system can create a data structure element for a field, such as for field 305 of FIG. 3. The data structure element can include members. For example, as part of digitizing the form template, the computer system can create members of the data structure element. For example, the computer system can create a member that defines the boundary of the field, another member that defines the field label, another memory that stores the location of the field, etc. The data structure of block 195 can be stored to disk for future use, such as when a filled-out version a form that matches the form template is received and the filled-out values of the various fields are extracted from the form and added to a database.

FIG. 8A is an illustration of a template pH Indicator table, consistent with various embodiments. Table 600 of FIG. 6 can be a template of a pH Indicator table, and table 800a can be table 600. Further, fields 805a-820a, area 825a, column 830a, area 835a, and row 840a can be, respectively, fields 605-620, area 625, column 630, area 635, row 640 of FIG. 6.

FIG. 8B is an illustration of a first image of a pH Indicator data table where the first image is shrunken relative to the template pH indicator table, consistent with various embodiments. Table 800b is an illustration of an image of table 800a that is shrunken with reference to table 800a. Fields 805b-820b, area 825b, column 830b, area 835b, and row 840b of FIG. 8b can be, respectively, fields 805a-820a, area 825a, column 830a, area 835a, and row 840a of FIG. 8a, however in an image of table 800a that is shrunken.

Figure 8C:
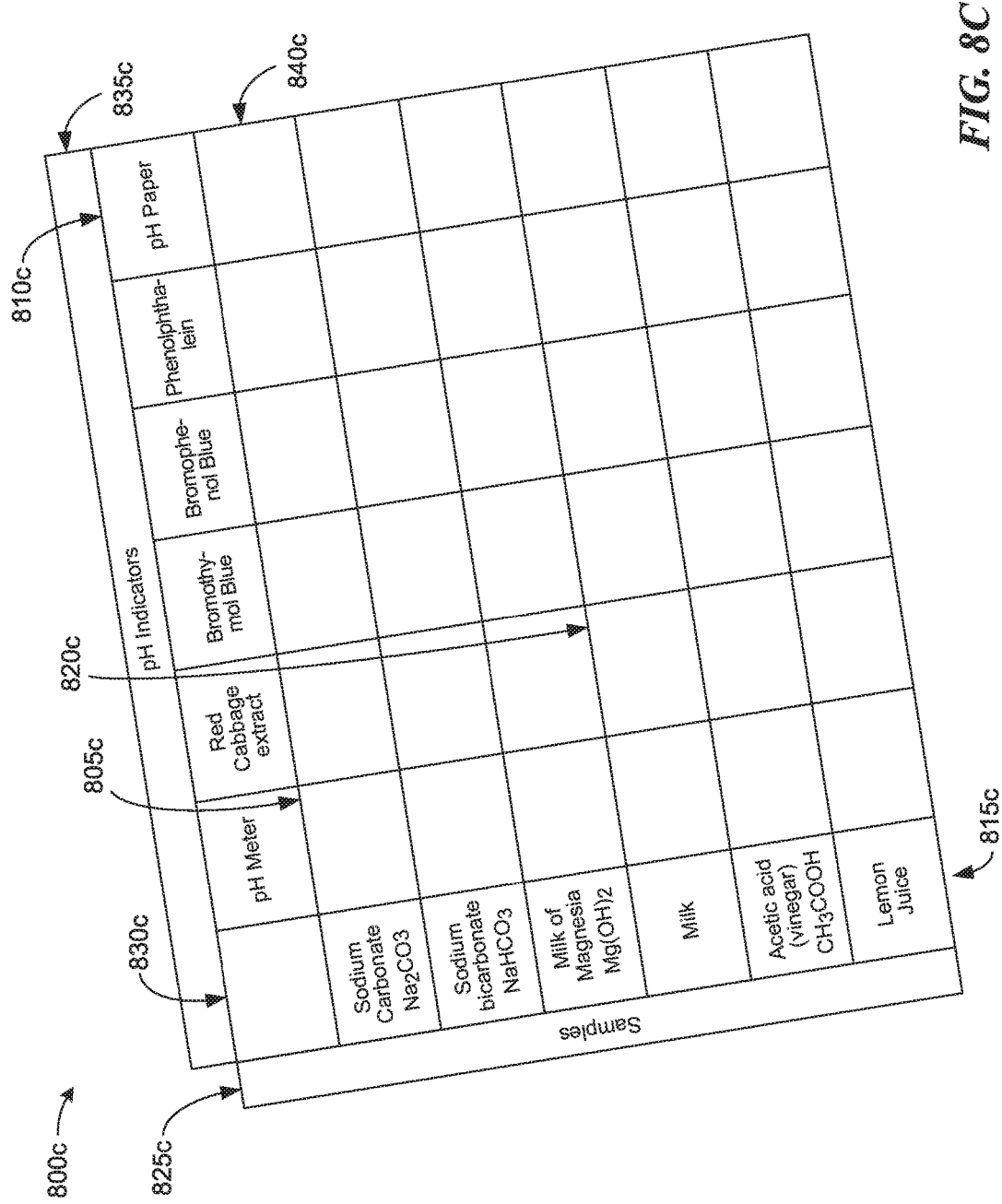
FIG. 8C is an illustration of a second image of a pH Indicator data table where the second image is rotated relative to the template pH indicator table, consistent with various embodiments.

FIG. 8C is an illustration of a second image of a pH Indicator data table where the second image is rotated relative to the template pH indicator table, consistent with various embodiments. Table 800c is an illustration of an image of table 800a that is rotated with reference to table 800a. Fields 805c-820c, area 825c, column 830c, area 835c, and row 840c of FIG. 8c can be, respectively, fields 805a-820a, area 825a, column 830a, area 835a, and row 840a of FIG. 8a, however in an image of table 800a that is rotated.

FIG. 8D is an illustration of a third image of a pH Indicator data table where the third instance is warped, consistent with various embodiments. Table 800d is an illustration of an image of table 800a that is warped with reference to table 800a. Fields 805d-820d, area 825d, column 830d, area 835d, and row 840d of FIG. 8d can be, respectively, fields 805a-820a, area 825a, column 830a, area 835a, and row 840a of FIG. 8a, however in an image of table 800a that is warped.

Figure 9:
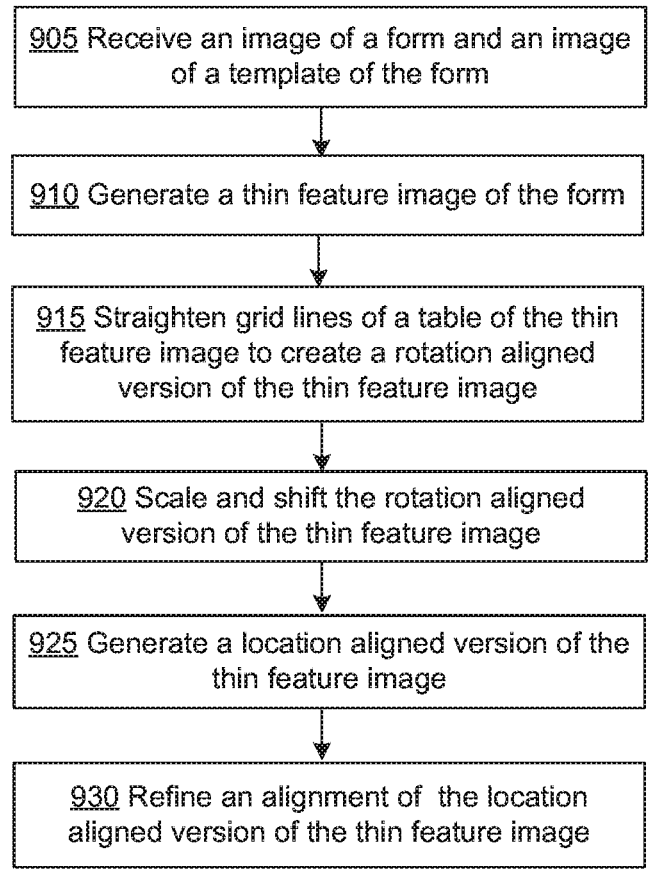
FIG. 9 is a flow diagram that illustrates a method for aligning grid lines of an image of a table of a form with grid lines of an image of a table of a template of the form, consistent with various embodiments.

FIG. 9 is a flow diagram that illustrates a method for aligning grid lines of an image of a table of a form with grid lines of an image of a table of a template of the form, consistent with various embodiments. While the method of the example of FIG. 9 is used to align grid lines of an image of a table of a form with grid lines of an image of a table of a template of the form, the method can be used to align grid lines of two images of a table, or grid lines of an image of a first table and grid lines of an image of a second table where the two tables are substantially identical, among others. While, in the example method of FIG. 9, some actions of the method are being applied to the image of the form, or are being applied to an image that is derived from an image of the form, these actions can also be applied to the image of the form template or to an image that is derived from the image of the form template. For example, both the image of the form and the image of the form template may need to be straightened, scaled, shifted, etc. to facilitate aligning the grid lines of the image of the table of the form with the grid lines of the image of the table of the form template, to facilitate matching the image of the form with the image of the form template, etc.

As discussed above, a process for automatically extracting, recognizing, and storing data entered by a user in a field of a selected form can include matching the selected form with a form template of a library of form templates. If the image of the selected form matches an image of a particular form template, the selected form can be identified as an instance of the particular form template. Once the image of the selected form is matched to the image of the particular form template, the pre-identified fields of the particular form template can be used to extract data from the corresponding fields of the selected form. In order to match an image of a form that includes a table with an image of a form template that includes a table, the image of the table of the form may need to be aligned with the image of the table of the form template. Aligning two images of a table can be challenging for a number of reasons, such as those discussed above.

Figure 14:
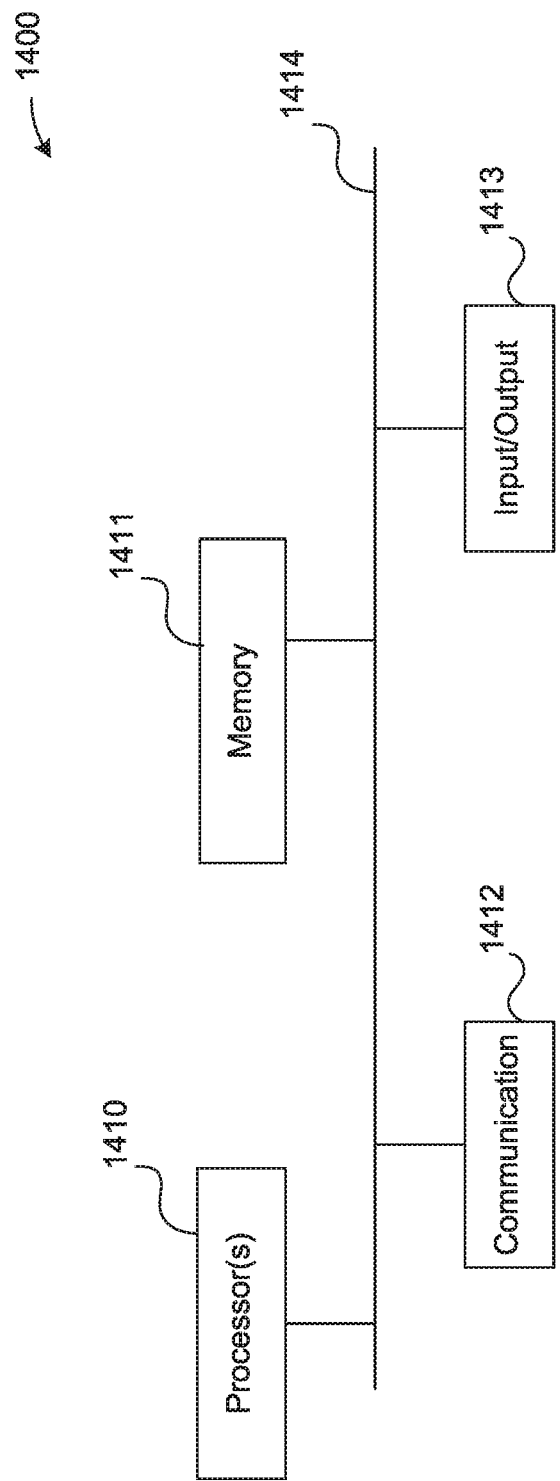
FIG. 14 is a block diagram illustrating an example of a processing system in which at least some operations described herein can be implemented, consistent with various embodiments.

At block 905, a computer system, such as processing system 1400 of FIG. 14, receives an image of a form, and receives an image of a template of the form, the template of the form also being referred to as the form template. The images can be received at the same time, or at different times. The image of the form can be generated by use of any image acquiring device, such as by taking a photo of the form, by scanning the form, etc. The form can be a blank form, can be a filled-out version of the form, etc. The image of the template of the form, or the form template, can similarly be generated. Further, the image of the form template can additionally be generated by use of an application program, such as a word processor, a spreadsheet program, etc. The application program can access an electronic file in which a representation of the form template is stored, and can generate the image of the form template, such as by generating a JPEG (Joint Photographic Expert Group), TIFF (Tagged Image File Format), GIF (Graphics Interchange Format), PNG (Portable Network Graphics), PDF (Portable Graphics Format), etc. The image of the form template can be received from a variety of sources, such as from a camera, from a scanner, from an application program, from a remote computer system, etc.

The form template or the image of the form template can also be obtained from a library of form templates. For example, the processes described above can be used to generate a library of form templates, where locations of all or some of the fields of each form template are identified and stored with the library of form templates, such as in digitized representations of the form templates. An image of a form can be matched with a form template from the library of form templates, such as by matching the image of the form with an image of the form template. A portion of the image defined by a field of the form, such as a portion of the form that is within an oversized version of a rectangle that defines an extent of the field, can be automatically extracted from the image of the form. Further, text or other graphic representations in the portion of the image can be automatically recognized and electronically stored. This can be repeated for each of the fields of the form.

However, when a form includes a table, it may be necessary or may increase compute efficiency to align the image of the table with an image of a table of a form template before or as part of determining whether the form matched with the form template. Aligning two images which include a table, such as two images of a table, or an image of a first table and an image of a second table where the first and second tables are identical or substantially identical, can be challenging for a number of reasons. For example, the two images can be at a different scale relative to each other, as is demonstrated in FIG. 8B where table 800*b* is shrunken with respect to table 800*a* of FIG. 8*a*. As another example, the two images can be at different rotations relative to each other, as is demonstrated in FIG. 8*c* where table 800*c* is at a different rotational orientation than is table 800*a*. As yet another example, either or both of the images can be warped or otherwise disfigured, as is depicted in FIG. 8*d*. Table 800*d* of FIG. 8*d* is an image of table 800*a*, where the image is warped with reference to table 800*a*. Table 800*d* may be warped because the image was captured by a camera that was oriented at an angle relative to table 800*a*, because the material on which table 800*a* is printed was bent when the image was captured, etc.

Figure 10:
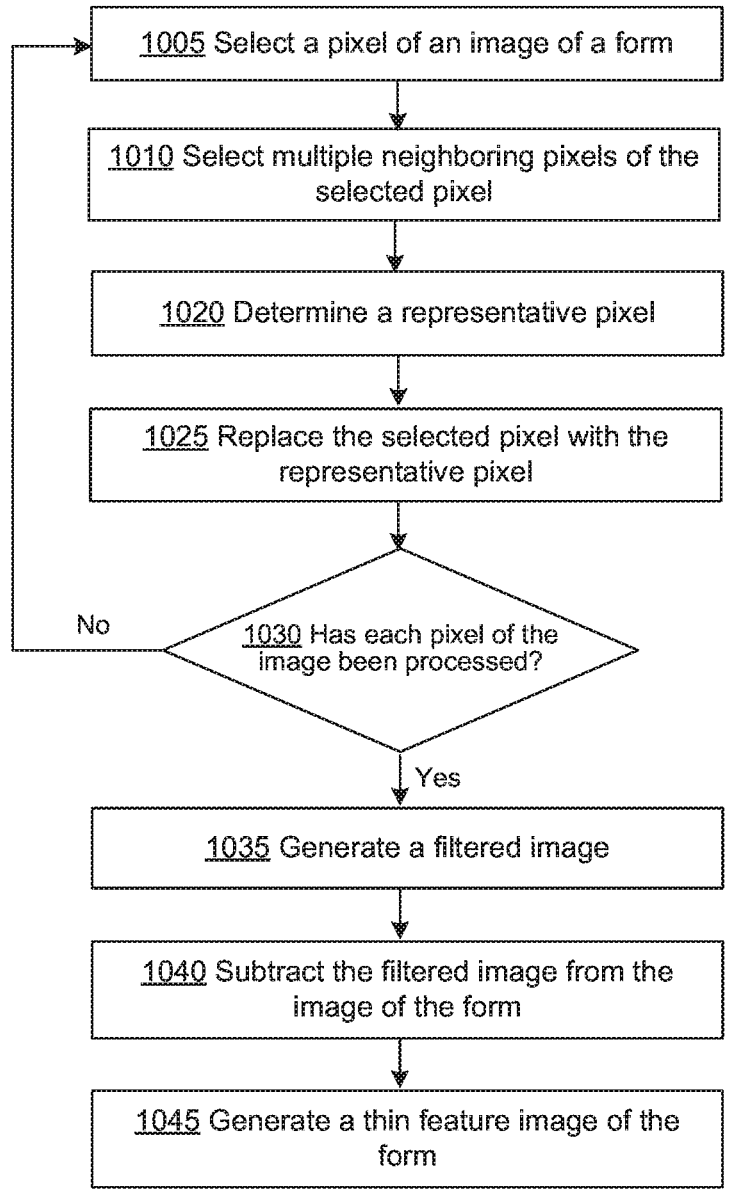
FIG. 10 is a flow diagram that illustrates a method for generating a thin feature image of a form, consistent with various embodiments.

At block 910, the computer system generates a thin feature image of the form. A thin feature image of a form is an image where wider features of the form have been filtered out, leaving thinner features of the form, such as grid lines and text. A thin feature image can further have step edges filtered out. Step edges are edges formed by a transition between constant regions. An example of a step edge can be when a scan or photo of a form extends beyond the edge of a piece of paper on which the form is printed. The paper side of the edge of the paper can be a first color in the image, and the other side of the edge of the paper can be a second color. The step edge of this example is the edge formed by the transition from the first color to the second color. The thin feature image can be generated by any of various techniques. For example, a filter algorithm that filters thin features of images can be executed by the computer system on the image of the form to create a filtered image of the form that has thin features filtered out. The filtered image of the form can be subtracted from the image of the form to generate a thin feature image of the form. FIG. 10 describes an example of a technique that can be used to generate a thin feature image of a form.

At block 915, the computer system straightens grid lines of a table of the thin feature image to create a rotation aligned version of the thin feature image. In some embodiments, straightening the grid lines has two aspects, a first aspect being to orient the grid lines to achieve a desired orientation with reference to an X or Y axis, and a second aspect being to linearize the grid lines to cause the grid lines to run in a straight line. The X axis can run horizontally and the Y axis vertically with reference to the thin feature image, or with reference to alignment of pixels of the thin feature image, and the X and Y axes can be perpendicular. For example, when pixels of the thin feature image are organized in rows and columns, the X axis can run parallel to the rows and the Y axis can run parallel to the columns.

Orienting the grid lines to achieve the desired orientation with reference to the X or Y axis can involve transforming the thin feature image to achieve a rotation of the thin feature image that has the desired orientation, such as by applying a first transformation to the thin feature image. For example, when the desired orientation of the grid lines is to be substantially parallel with or perpendicular to a selected one of the X or the Y axis, the thin feature image can be transformed to achieve a rotation of the thin feature image where the grid lines achieve the desired orientation.

Figure 11:
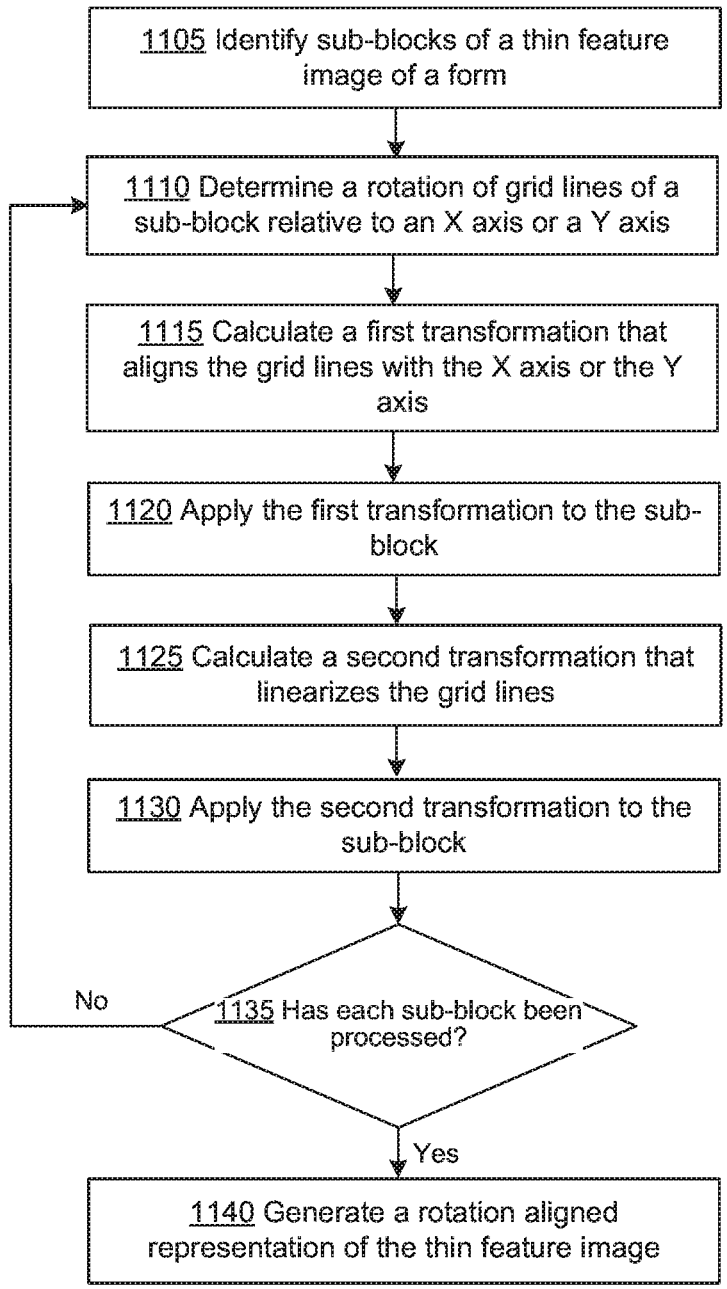
FIG. 11 is a flow diagram that illustrates a method for generating a rotation aligned representation of a table of a form, consistent with various embodiments.

Linearizing the grid lines to cause the grid lines to run in a straight line can involve removing or reducing bends, warps, discontinuities, or other non-straight features of the grid lines, such as by applying a second transformation to the thin feature image. The computer system can create a rotation aligned version of the thin feature image by applying the first transformation and the second transformation, or by applying any other technique that straightens the grid lines of the table of the thin feature image. In some embodiments, the first transformation and the second transformation are a same transformation that transforms the thin feature image and both orients the grid lines to achieve a desired orientation with reference to an X or a Y axis, and linearizes the grid lines. FIG. 11 describes an example of a technique that can be used to straighten grid lines of a table of a thin feature image to create a rotation aligned version of the thin feature image.

At block 920, the computer system scales and shifts the rotation aligned version of the thin feature image. When an image of a form is created, the image can have been created at a different scale, or at an offset relative to an image of the form template of which the form is an instance. For example, the image of the form can have been created by a scanner with a first resolution, and the image of the form template can have been created by a camera with a second resolution, where the first resolution and second resolution are different. These different resolutions can cause the size of the scanned image (i.e., the image of the form) and the size of the photographic image (i.e., the image of the form template) to differ in the size. For example, a table in the scanned image can be 1000 by 1000 pixels in size, and the image of the corresponding table in the photographic image can be 2000 by 2000 pixels in size. In order to facilitate aligning the table of the form with the table of the form template, one or both of the scanned image and the photographic image can be scaled so that both tables are at a same scale. For example, the scanned image can be scaled from 2000 by 2000 pixels in size to 1000 by 1000 pixels in size, which causes both the scanned image and the photographic image to be at a same scale, which, in this example, is 1000 by 1000 pixels.

Further, when the photo of the form template was taken, the table can be offset in the photographic image relative to the scanned image of the form. For example, the scanned image may have the table centered in the scanned image, while the photographic image may have the table in a corner of the photographic image. In order to facilitate aligning the image of the table of the form with the image of the table of the form template, one or both of the scanned image and the photographic image can be offset so that both tables are at a same location.

For example, the scanned image can have the center of the table at coordinate (500, 500) of the scanned image, while the photographic image can have the center of the table at coordinate (100, 100) of the photographic image. In this example, the photographic image can be shifted by 400 pixels in both the X and Y directions, so that the center of the table of the photographic image is shifted from (100, 100) to (500, 500).

Figure 12:
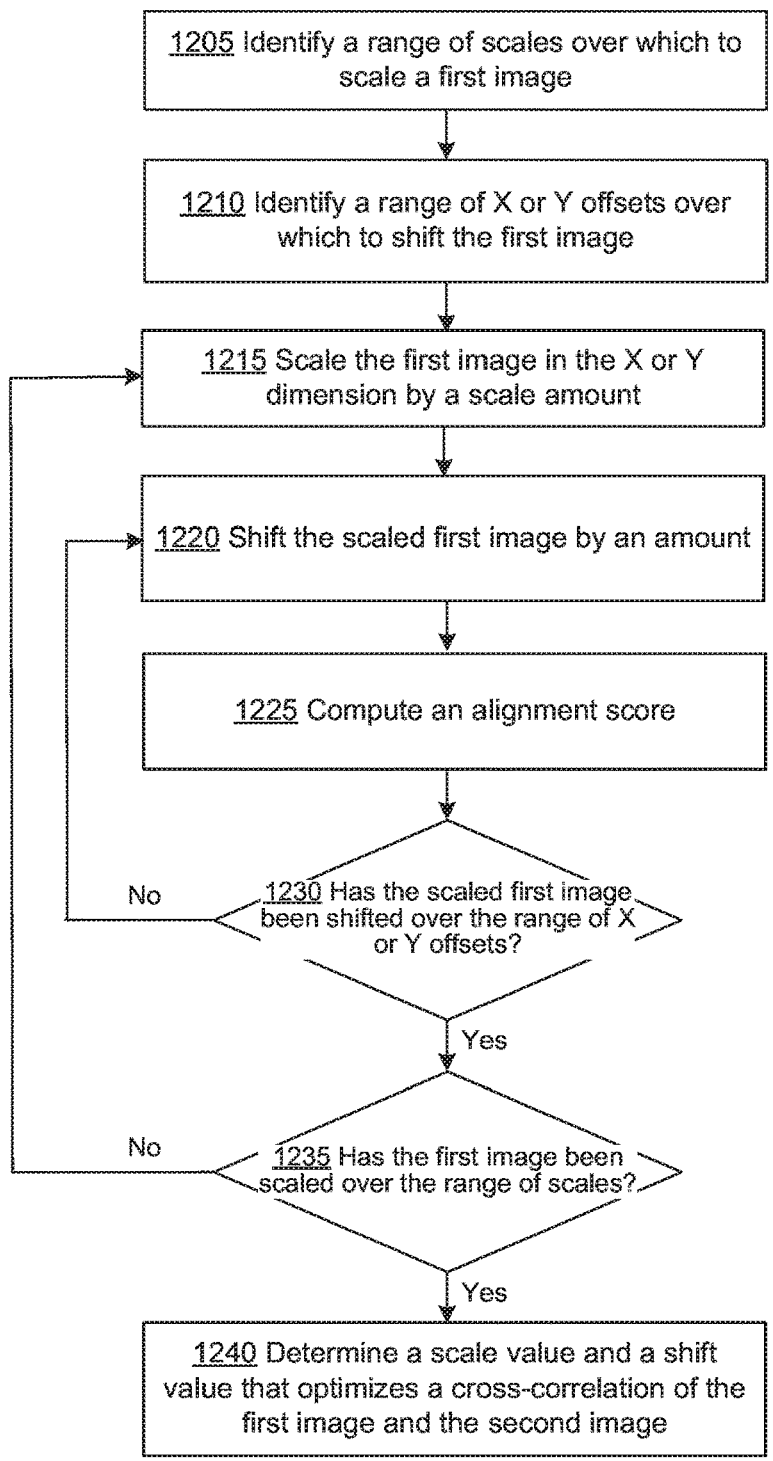
FIG. 12 is a flow diagram that illustrates a method for scaling and shifting an image of a form that includes a table, consistent with various embodiments.

With both tables now having a scale of 1000 by 1000 pixels, and with the center of both tables being at (500, 500) in their respective images, the computer system can generate a location aligned version of the thin feature image (block 925) by applying the scaling and shifting to the rotation aligned version of the thin feature image. The location aligned version of the thin feature image can be represented in a TIFF, JPEG, etc. format, can be represented by data stored in memory, etc. In this example, the image of the table of the rotation aligned version of the thin feature image is 1000 by 1000 pixels in size, and the center of the table is at (500, 500) of the rotation aligned version of the thin feature image. The computer system can scale and shift the rotation aligned version of the thin feature image using any applicable technique. FIG. 12 describes an example of a technique that can be used to scale and shift the rotation aligned version of the thin feature image.

At block 930, the computer system refines an alignment of the location aligned version of the thin feature image. When refining the alignment, the grid lines of the table of the location aligned version of the this feature image are more closely aligned with the grid lines of the image of the form template. The computer system can apply any appropriate technique to accomplish the refinement of the alignment. FIG. 13 describes an example of a technique that can be used to refine an alignment of the location aligned version of the thin feature image with the image of the form template.

With the grid lines of the table of the location aligned version of the this feature image now being more closely aligned with the grid lines of the image of the form template, a determination can be made that the form is an instance of the form template, and the text in the fields of the table of the form can be automatically extracted and captured using processes like those described above.

FIG. 10 is a flow diagram that illustrates a method for generating a thin feature image of a form, consistent with various embodiments. Block 910 of FIG. 9 can be accomplished using the method of FIG. 10, among other methods. At block 1005, a computer system selects a pixel of an image of a form, the pixel being referred to as the selected pixel. At block 1010, the computer system selects multiple neighboring pixels of the selected pixel. A neighboring pixel can be any pixel that has a pre-defined location relative to the selected pixel. In an example, a neighboring pixel is a pixel that abuts the selected pixel horizontally, vertically, or diagonally. If one envisions a three by three matrix of pixels with the center pixel being the selected pixel, for this example the neighboring pixels would the remaining eight pixels. In another example, a pixel is a neighboring pixel if it is not the selected pixel, and is within a five by five matrix of pixels where the center pixel is the selected pixel. In yet another example, a pixel is a neighboring pixel if it is not the selected pixel, and is within a one by 5 matrix of pixels where the center pixel is the selected pixel. When the selected pixel is near to the edge of the image, such that the matrix extends beyond the edge of the image, the matrix size can be reduced so that it does not extend beyond the edge of the image.

At block 1020, the computer system determines a representative pixel. The representative pixel can be determined in any of various ways, such as based on the neighboring pixels, based on the neighboring pixels and the selected pixel, etc. In some embodiments, the representative pixel is determined based on a selected pixel group that includes the neighboring pixels and the selected pixel. For example, the representative pixel can be the median pixel of the selected pixel group. In this example, the pixels are sorted by value, and the pixel in the middle of the sorted list of pixels is identified as the representative pixel. As another example, the representative pixel can be the average of the pixels of the selected pixel group. In this example, the values of the pixels are summed to generate a dividend. The dividend is divided by a divisor that is set to the number of pixels in the selected pixel group. The average of the pixel values is the quotient of the division. The representative pixel can be set to a value equal to the average of the pixel values.

At block 1025, the computer system replaces the selected pixel with the representative pixel, such as in a filtered version of the image. At block 1030, the computer system makes a decision whether each pixel of the image has been processed. When one or more pixels of the image have not been processed, block 1005 is executed again on another pixel of the image of the form. When all pixels of the image have been processed, block 1035 is executed next. At this point, each pixel of the image of block 1005 has been replaced with a representative pixel in the filtered version of the image. At block 1035, the computer system generates a filtered image, such as by storing the filtered version of the image at a storage device, or by storing data in memory that represents the filtered image.

At block 1040, the computer system subtracts the filtered image from the image of the form. To subtract a first image from a second image, the value of each pixel of the first image is subtracted from the value of a corresponding pixel of the second image. For example, the value of the pixel at location (0, 0) of the first image (the (0, 0) pixel of the first image) is subtracted from the value of the (0, 0) pixel of the second image, the value of the (0, 1) pixel of the first image is subtracted from the value of the (0, 1) pixel of the second image. This process is continued until each pixel in the first image has been subtracted from its corresponding pixel of the second image.

When the pixel value of the first and second images are equal or are close in value, the result of the subtracting the two pixels is a pixel with a zero or very small value. However, when the value of the pixel of the first image is zero or very small, such as when a thin feature is filtered out of a pixel of the first image, the result of subtracting the pixel of the first image from the pixel of the second image is a pixel value that equals or is very close in value to the value of the pixel of the second image. When two images are identical or nearly identical, the result of subtracting the two images is a blank or nearly blank image. When two images are nearly identical, except that the first image has thin features filtered out, the image that results from subtracting the first image from the second image is an image that includes the thin features that were filtered out of the first image, but are in the second image. At block 1045, the computer system generates a thin feature image of the form, such as by storing the image created as the result of block 1040 to a TIFF, JPEG, etc. image file, or by storing a representation of the image in a memory of the computer system.

FIG. 11 is a flow diagram that illustrates a method for generating a rotation aligned representation of a table of a form, consistent with various embodiments. Block 915 of FIG. 9 can be accomplished using the method of FIG. 11, among other methods. When an image of a form that includes a table is generated, the image may differ from an image of a template of the form. For example, the image of the form may have a different angular orientation than the image of the form template. This can happen for a variety of reasons, such as due to the form being rotationally askew when the form is scanned by the scanner to create the image of the form, due to a camera that is used to generate the image of the form not being held at a proper rotational angle relative to the form, etc. As another example, the image may be warped or otherwise disfigured with respect to the image of the form template or the form template. This can similarly happen for a variety of reasons, such as due to the paper of the form being bent or otherwise disfigured when the image of the form is obtained, due to the image capturing device being oriented at an angle with reference to the plane of the form, etc.

At block 1105, a computer system identifies sub-blocks of a thin feature image of a form. In order to accelerate processing of the thin feature image, the thin feature image can be conceptually broken into pieces in order to reduce the run times, memory image size, etc. when processing the thin feature image, in order to enable parallel processing of the thin feature image, etc. The sub-blocks can be sized to achieve a desired run time, to achieve a desired granularity or sub-block size, to achieve a desired memory image size, to enable a desired level of parallel processing, or for any of a number of other reasons. In some embodiments, the number of sub-blocks identified is one.

As an example of identifying sub-blocks, when a thin feature image of a form is 1000 by 1000 pixels (with pixel coordinates ranging from (0, 0) to (999, 999), and the desired size of a sub-block is 100,000 pixels, the thin feature image can be conceptually broken into ten 100 by 1000 pixel sub-blocks. A first sub-block, which is comprised of the pixels from coordinate (0, 0) to (99, 999), can be created. A second sub-block, which is comprised of the pixels from coordinate (100, 0) to (199, 999), can be created. This process can continue until a tenth sub-block, which is comprised of the pixels from coordinate (900,0) to (999, 999), is created. Separate data structures or other representations of each sub-block, such as JPEG, TIFF, etc. files, can be created for each sub-block.

At block 1110, the computer system determines a rotation of grid lies of a sub-block relative to an X axis or a Y axis. In some embodiments, the computer system determines two rotations of grid lines, a first relative to an X-axis (e.g., that corresponds to rotation of horizontal grid lines relative to the X-axis), and a second relative to a Y-axis (e.g., that corresponds to rotation of vertical grid lines relative to the Y-axis). The X axis can run horizontally and the Y axis vertically with reference to the thin feature image, or with reference to alignment of pixels of the thin feature image, and the X and Y axes can be perpendicular. It may be instructive to leverage the example of FIG. 8A. FIG. 8A can represent a form where a user enters data in table 800a of the form. Further, a thin feature image of the form of FIG. 8A can be substantially or nearly identical to the form of FIG. 8A, as the form of 8A may have only lines and text, which may not be filtered out in a thin feature image of the form of FIG. 8A. In a case where the thin feature image of the form of FIG. 8A is substantially identical to the form of FIG. 8A, an X axis can run parallel to the horizontal grid lines of table 800a, and a Y axis can run parallel to the vertical grid lines of table 800a. In such a case, the grid lines of any sub-block would have no rotation relative to the X and Y axes, as the horizontal grid lines run parallel to the X axis, and the vertical grid lines run parallel to the Y axis.

It may be further instructive to leverage the example of FIG. 8C. FIG. 8C can similarly represent a thin feature image. The rows of pixels of the image represented by FIG. 8C can run horizontally with relative to the illustration of FIG. 8C, and the X axis can similarly run horizontally. However, the grid lines of table 800c of FIG. 8C do not run parallel to either the X or Y axes of FIG. 8C, but rather run at an angle with reference to the axes.

The rotation of the grid lines can be determined using any of various techniques. For example, a Hough transform can be used to detect the rotation of the grid lines. A Hough transform can also be used to detect the grid lines. The sub-block can be Hough transformed with angular samples relative to the X or Y axes in a pre-determined range, such as from −20 degrees to +20 degrees relative to the X axis or the Y axis. The dominant orientations in each sub-block can be determined by summing the squared Hough-transform bins for each angular sample and selecting the maximum. The Hough transform can be calculated by rotating each sub-block by each orientation, and summing vertically or horizontally.

Figure 15:
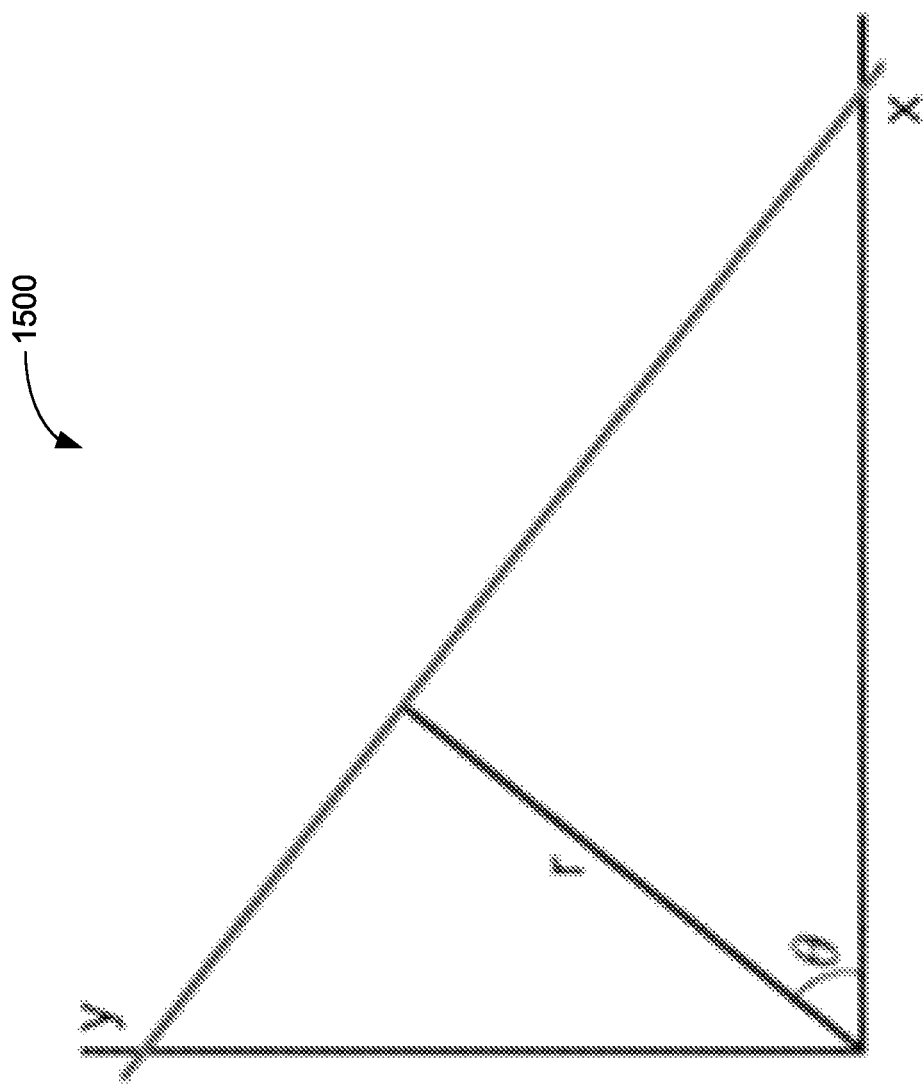
FIG. 15 is a graph illustrating a line being expressed with parameters ($r$,θ), consistent with various embodiments.

A Hough transform is a feature extracting technique used in image analysis, and can be used to identify lines in an image. A line can be expressed with two variables. For example, in the Cartesian coordinate system, a line can be expressed with parameters $(m, b)$ in the form $y = mx + b$. In the Polar coordinate system, a line can be expressed with parameters $(r, \theta)$ in the form $r = x \cos \theta + y \sine$ where $r$ is the distance from the origin to the closest point on the straight line, and $\theta$ is the angle between the x axis and the line connecting the origin with that closest point. Graph 1500 of FIG. 15 includes a demonstrative illustration.

It is therefore possible to associate with each line of the image a pair ($r,\theta$). The ($r,\theta$) plane is sometimes referred to as Hough space for the set of straight lines in two dimensions.

Figure 16:
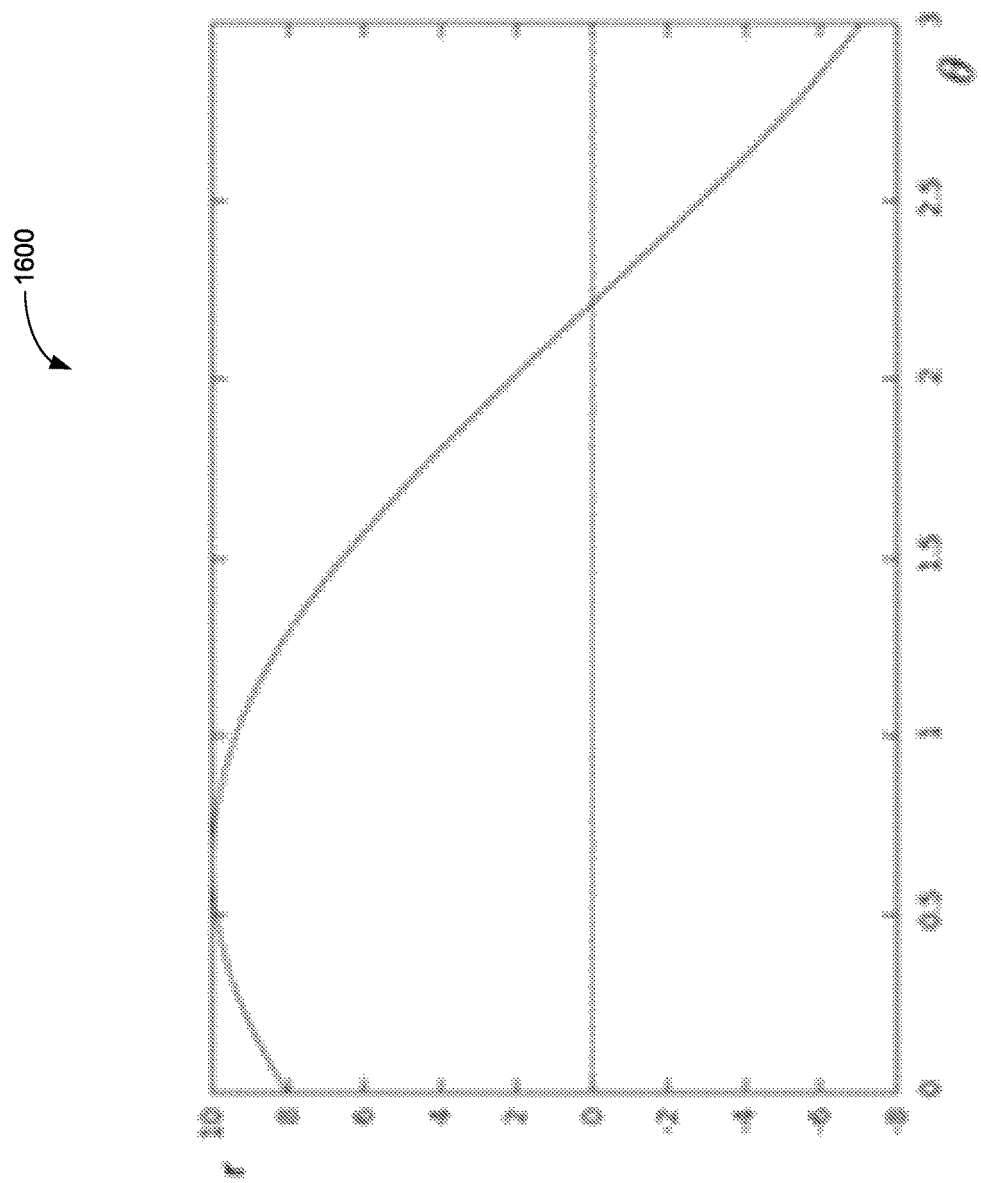
FIG. 16 is a graph illustrating a sinusoid for $x_0$=8 and $y_0$=6 in a plane θ-$r$, consistent with various embodiments.

In general, for each point ($x_0,y_0$), the family of lines that goes through that point can be defined as: $r_\theta = x_0 \cos \theta + y_0 \sin \theta$, meaning that each pair ($r_\theta,\Theta$) represents each line that passes by ($x_0,y_0$). If for a given ($x_0,y_0$) the family of lines that goes through the given point is plotted, a sinusoid is produced. For instance, for $x_0=8$ and $y_0=6$, graph 1600 of FIG. 16 is produced (in a plane $\theta$-$r$):

Only points such that $r > 0$ and $0 < \theta < 2\pi$ are considered.

The linear Hough transform uses a two-dimensional array, called an accumulator, to detect the existence of a line described by $r = x \cos \theta + y \sin \theta$. The dimension of the accumulator equals the number of unknown parameters, e.g., two, considering quantized values of r and $\theta$ in the pair (r,$\theta$). For each pixel at (x,y) and its neighborhood, the Hough transform algorithm can determine if there is enough evidence of a straight line at that pixel. If so, it can calculate the parameters (r,$\theta$) of that line, and then look for the accumulator's bin that the parameters fall into, and increment the value of that bin. By finding the bins with the highest values, such as by looking for local maxima in the accumulator space, the most likely lines can be extracted, and their (approximate) geometric definitions determined. One way of finding these peaks is by applying some form of threshold. Other techniques can be used as well.

A result of the linear Hough transform can be a two-dimensional array (matrix) similar to the accumulator— where one dimension of this matrix is the quantized angle $\theta$ and the other dimension is the quantized distance r. Each element of the matrix has a value equal to the number of points or pixels that are positioned on the line represented by quantized parameters (r,$\theta$). So the element with the highest value indicates the straight line that is most represented in the input image.

At block 1115, the computer system calculates a first transformation that aligns the grid lines with the X axis or the Y axis. In some embodiments, block 115 includes calculating two alignment transformations, a first alignment transformation that aligns horizontal lines with the X-axis, and a second alignment transformation that aligns vertical lines with the Y-axis. An alignment transformation can be determined based on any of a number of algorithms. Examples of some algorithms that can be used for an alignment transformation can be found at http://leptonica.com/rotation.html (an archive of which can be found at https://web.archive.org/web/20150318192803/http://leptonica.com/rotation.html). The alignment transformation can be, among others: a rotation by sampling, which chooses the value of each destination pixel to be that of the source pixel closest to the location the destination pixel came from (i.e., before rotation); a rotation by shear, which, depending on the implementation, is an approximation to rotation by sampling; or a rotation by area mapping, which computes the value of each destination pixel from four source pixels from which it was derived, suitably weighted by the actual overlap. In some embodiments, an alignment transformation is a rotational offset of one or more grid lines from an X-axis or a Y-axis (e.g., horizontal grid lines have a –2% rotational orientation relative to the X-axis, and vertical grid lines have a –1.5% rotational orientation relative to the Y-axis). In some embodiments, for example, when the computer system calculates a first rotational offset for a vertical line and a second rotational offset for a horizontal line, the computer system can solve for a polynomial warp which maps these orientations to vertical and horizontal, using a robust error function to reject outliers. The computer system can apply a cost function to the detected orientations in each subblock by taking two points that are collinear in the detected orientation, and applying the cost function to the difference in warped y-coordinate for the horizontal orientations and the difference in warped x-coordinate for the vertical orientations.

At block 1120, the computer system applies the first transformation to the sub-block, which results in the creation of an intermediate version or representation of the sub-block where the grid lines are substantially aligned with either the X axis or the Y axis. Grid lines that are aligned with the X axis run horizontally, and grid lines that are aligned with the Y axis run vertically.

At block 1125, the computer system calculates a second transformation that linearizes the grid lines. Grid lines may need to be linearized when they are warped or otherwise disfigured with respect to a straight line. As previously discussed, linearizing a line causes the line to run in a straight or substantially straight line, and can involve removing or reducing bends, warps, discontinuities, or other non-straight features of the line. Any of various algorithms can be used to linearize a grid line. For example, a warping model can be used, such as a polynomial warping model of the form $u(x,y)=a_0x+a_1y+a_2x^2+a_3xy+a_4y^2+\ldots$, $v(x,y)=b_0x+b_1y+b_2x^2+b_3xy+b_4y^2+\ldots$, which maps the input coordinate (x,y) to the output coordinate (u,v).

In some embodiments, based on detection of the grid lines of the sub-block by the Hough transform, a first grid line is identified. For a grid line that runs horizontally, the horizontal grid line should ideally be linear, and, when the horizontal grid line is not linear, it may need to be linearized. When a horizontal grid line is linear, the left and right end points of the horizontal grid line, and all the remaining points of the horizontal grid line, have a same or substantially same y-coordinate. For a grid line that runs vertically, the vertical grid line should ideally be linear, and, when the vertical grid line is linear, the top and bottom end points of the vertical grid line, and all the remaining points of the vertical grid line, should have a same or substantially same x-coordinate. Due to warpage or other disfigurement of a grid line, a grid line may not be linear. For example, some or even most of the points of a horizontal grid line may not be at or substantially at a same y-coordinate, or some or even most of the points of a vertical grid line may not be at or substantially at a same x-coordinate.

To facilitate or accomplish linearizing a grid line, a transformation is calculated that linearizes the points of the grid line such that, for horizontal grid lines, the points are at or substantially at a same y-coordinate, and for vertical grid lines, the points are at or substantially at a same x-coordinate. The grid lines can be transformed using any of various algorithms. For example, the grid lines can be transformed based on a warping model, such as the polynomial warping model previously discussed.

Returning to the first grid line, when the first grid line is a horizontal line and is not linear, the computer system can create a reference straight horizontal line that ends at the x-coordinates of the end points of the first grid line. When the first grid line is a vertical line and is not linear, the computer system can create a reference straight vertical line that ends at the y-coordinates of the end points of the first grid line. A warping model, such as the previously discussed polynomial warping model, can be used to linearize the first grid line. The warping model can be used to minimize a difference between a y-coordinate of the first grid line and a y-coordinate of the reference straight horizontal line when the first grid line is a horizontal grid line, and can be used to minimize a difference between an x-coordinate of the first grid line and an x-coordinate of the reference straight vertical line when the first grid line is a vertical grid line. While a standard least squares algorithm could be used, it has been determined to be sensitive when an outlier is present. A cost functions which doesn't penalize large errors as significantly, such as a robust cost function, can be utilized.

In some embodiments, for example, when the computer system calculates a first rotational offset for a vertical line and a second rotational offset for a horizontal line, the warping model can be used to linearize two orientations of lines, such as the vertical and horizontal lines. The warping model can be a polynomial warp which maps these orientations to vertical and horizontal, using a robust error function to reject outliers.

An example of a robust cost function is an M-estimator. Let $r_i$ be the residual of the $i^{th}$ datum, the difference between the $i^{th}$ observation and its fitted value. The standard least-squares method tries to minimize $\Sigma_i r_i^2$, which can be unstable if there are outliers present in the data. Outlying data can give an effect sufficiently strong in the minimization that the parameters thus estimated are distorted. An M-estimator can reduce the effect of outliers by replacing the squared residuals $r_i^2$ by another function of the residuals, yielding $$\min \sum_i \rho(r_i) \qquad (11\text{-}1)$$

where $\rho$ can be a symmetric, positive function with a unique minimum at zero, and can be chosen to be less increasing than square. Instead of solving directly this problem, it can be implemented as an iterated reweighted least-squares one. The following is such an example.

Let $p=[p_1, \ldots, p_m]^T$ be the parameter vector to be estimated. In this example, the M-estimator of p based on the function $\rho(r_i)$ is the vector p which is the solution of the following m equations:

$$\sum_i \psi(r_i) \frac{\partial r_i}{\partial p_j} = 0, \text{ for } j = 1, \ldots, m, \qquad (11\text{-}2)$$

where the derivative $\psi(x)=d\rho(x)/dx$ is called the influence function.

If a weight function is defined as follows:

$$w(x) = \frac{\psi(x)}{x} \qquad (11\text{-}3)$$

then Equation (11-2) becomes $$\sum_i w(r_i) r_i \frac{\partial r_i}{\partial p_j} = 0, \text{ for } j = 1, \ldots, m \qquad (11\text{-}4)$$

This is the system of equations that can be obtained if the following iterated reweighted least-squares problem is solved $$\min \sum_i w(r_i^{(k-1)}) r_i^2 \qquad (11\text{-}5)$$

where the superscript (k) indicates the iteration number. The weight $w(r_i^{(k-1)})$ can be recomputed after each iteration in order to be used in the next iteration.

The influence function $\psi(x)$ measures the influence of a datum on the value of the parameter estimate. For example, for the least-squares with $\rho(x)=x^2/2$, the influence function is $\psi(x)=x$, that is, the influence of a datum on the estimate increases linearly with the size of its error, which confirms the non-robustness of the least-squares estimate. In some embodiments, a robust estimator can prevent the influence of any single observation (datum) from causing a significant offset. There are several constraints that some embodiments of a robust M-estimator meets:

The first is to have a bounded influence function.

The second is that the robust estimator be unique. This implies that the objective function of parameter vector p to be minimized should have a unique minimum. In some embodiments, this can require that the individual ρ-function is convex in variable p. This can be necessary in these embodiments because only requiring a ρ-function to have a unique minimum may not be sufficient. This can be the case with maxima when considering mixture distribution; the sum of unimodal probability distributions can be multi-modal. The convexity constraint is equivalent to imposing that $$\frac{\partial^2 \rho(.)}{\partial p^2}$$

is non-negative definite.

The third one is a practical requirement. Whenever $$\frac{\partial^2 \rho(.)}{\partial p^2}$$

is singular, the objective preferably has a gradient, $$\frac{\partial \rho(.)}{\partial p} \neq 0.$$

This can avoid having to search through the complete parameter space.

Based on the detection of the grid lines of the sub-block by the Hough transform, grid lines are identified, and a warping algorithm is applied to the grid lines. In some embodiments, the algorithm is additionally applied to non-grid lines.

At block 1130, the computer system applies the second transformation to the sub-block, or to the intermediate version or representation of the sub-block that was created at block 1120, which results in in the creation of a version or representation of the sub-block where the grid lines are substantially linear. At block 1135, a determination is made whether each of the sub-blocks have been processed. If no, block 1110 is executed for one of the unprocessed sub-blocks of the thin feature image. If all the sub-blocks have been processed, then block 1140 is next executed. At block 1140, the computer system generates a rotation aligned representation of the thin feature image, such as by storing the version or representation of the sub-block created at block 1130 to a TIFF, JPEG, etc. image file, or by storing the version or representation of the sub-block at a memory of the computer system. In some embodiments, rather than applying the transformations of blocks 1120 and 1130 at the sub-block level, the information determines at blocks 1115 and 1125 are used to determine a global transformation, and the global transformation is applied to all or a portion of the thin feature image of the form.

FIG. 12 is a flow diagram that illustrates a method for scaling and shifting a first image of a form that includes a table, consistent with various embodiments. Block 920 of FIG. 9 can be accomplished using the method of FIG. 12, among other methods. The first image of the form can be the rotation aligned version of the thin feature image that was created at block 915 of FIG. 9, and the first image can be scaled and shifted to align with a second image, such as the template of the form. At block 1205, a computer system or a user identify a range of scales over which to scale a first image, such as from a 50% scale to a 150% scale. With knowledge of the various ways that images of forms are created, the user can define maximum and minimum scales that are likely to happen when images are created, and the user can identify the range of scales based on these maximum and minimum scales. As the computer system gathers data or other statistics as it determines scales of forms, the computer system can refine the range of scales that are likely to happen when images are created based on this historic data or statistics. Based on this historic scale data or statistics, the computer system can identify, or refine, the range of scales over which to scale a first image.

At block 1210, a computer system or a user identify a range of X or Y offsets over which to shift a first image. With knowledge of the various ways that images of forms are created, the user can define a maximum offset that is likely to happen when an image of a form is created, and the user can identify a range of offsets based on this maximum offset. As the computer gathers data or other statistics at it determines offsets of forms, the computer system can refine the range of offsets that are likely to happen when images are created based on this historic offset data or statistics. Based on this historic offset data or statistics, the computer system can identify, or refine, the range of offsets over which to shift a first image.

At block 1215, the computer system scales the first image in the X or Y dimension by a scale amount. The computer system, at blocks 1215 through 1235, iterates though various scale and shift values in an attempt to determine a scale and a shift value that optimizes an alignment of the first image with a second image. In some embodiments, the scaling and shifting is done separately for the x and y dimensions. For example, in a first set of iterations at blocks 1215 through 1235, the computer system scales the first image in the X dimension (block 1215), shifts the scaled first image relative to the second image (block 1220), and computes an alignment score (block 1225). The computer system can, in a second set of iterations at blocks 1215 through 1235, scale the first image in the Y dimension (block 1215), shift the scaled first image relative to the second image (block 1220), and computes an alignment score (block 1225).

The range of scales can run, for example, from a minimum scale, such as 80%, to a maximum scale, such as 120%. The range of X or Y offsets can run, for example, from a first value to a second value. For example, the first value can be minus 200 pixels in the X and Y dimensions, and the second value can be plus 200 pixels in the X and Y dimensions. The computer system can iterate over this range. For example, the computer system can scale the first image by 80% (block 1215), and can iterate over various shifts from (−200, −200) pixels to (200, 200) pixels, such as in 5 pixel increments (block 1220).

As each iteration reaches block 1225, the computer system computes an alignment score. Computing an alignment score can include, can result, or can be derived from, calculating a cross-correlation of the scaled shifted first image with the second image, and the cross-correlation can be used in a determination of an alignment score. The cross-correlation can be calculated in any of various ways. For example, the value of a pixel of the scaled shifted first image can be multiplied by the value of a pixel of the second image at a same location when the scaled shifted first image and the second image are overlaid. When a grid line of the scaled shifted first image aligns with a grid line of the second image, a dot product of pixels of the two images will show a peak where the pixels of the grid lines align. When the two grid lines do not align, a dot product of pixels of the two images will show smaller values at the locations of the two grid lines. As the first image is scaled and shifted, the values of the dot products can be monitored, and peaks in the dot products can identify scales or shifts that maximize alignment between the grid lines of the shifted scaled first image and the second image. In another example, the cross-correlation is calculated at each iteration based on a fast Fourier transform (FFT).

After each iteration over the range of X or Y offsets, at block 1230, a determination is made whether the first image has been shifted over the range of X or Y offsets. If no, block 1220 is executed next at the next X or Y offset. If yes, at block 1235, a determination is made whether the first image has been scaled over the range of scales. If no, block 1215 is executed next at the next scale amount. If yes, then block 1240 is executed next. At block 1240, the computer system determines a scale value and a shift value that optimizes a cross-correlation of the first image and the second image. The scale value, which may be a different scale in the X and Y dimensions, or may be a same value in both dimensions, stretches or shrinks the first image to cause a table in the first image to be substantially the same size as a table in the second image. The shift value, which is an offset of the first image in the X and Y dimensions, causes a table in the first image to substantially align with a table in the second image.

The orders of the blocks of FIG. 12, as well as the other figures, can be varied. For example, in some embodiments, the shifting of block 1220 occurs before the scaling of block 1214 for each iteration. Further, in some embodiments, the scaling and shifting are done as one operation.

Figure 13A:
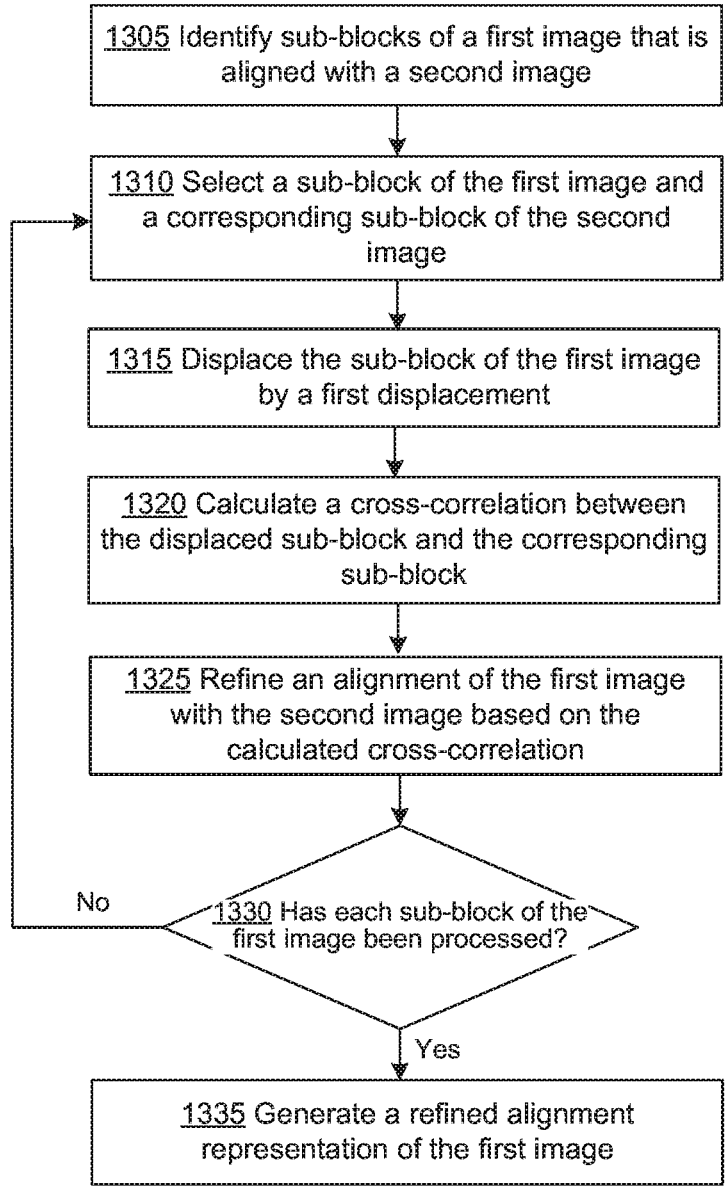
FIGS. 13A and 13B are flow diagrams that each illustrate a method of refining an alignment of an image of a table of a form with an image of a table of a template of the form, consistent with various embodiments.

FIG. 13A is a flow diagram that illustrates a first method of refining an alignment of an image of a table of a form with an image of a table of a template of the form, consistent with various embodiments. Block 930 of FIG. 9 can be accomplished using the method of FIG. 13A or 13B, among other methods. After the thin feature image of the form is location aligned to the image of the form template, an alignment of the table of the thin feature image with the table of the image of the form template can be further refined. As a result of the thin feature image being location aligned, when the thin feature image of the form is overlaid over the image of the template of the form, the grid lines of the table of the thin feature image line up pretty well with the grid lines of the table of the form template image. The two images have been rotation aligned, have been scaled to a substantially same scale, have been positionally aligned, and the grid lines have been straightened. As a result, the grid lines of both tables align pretty well. Now that the thin feature image has been location aligned to the form template, the alignment can be refined based on any of various algorithms, such as a one or two dimensional non-linear alignment. Further, because of the achieved close alignment of the two tables, methods of refining the alignment that are too computationally expensive when the two tables are badly aligned, but are computationally tolerable when the two tables are well aligned, can be used.

At block 1305, a computer system identifies sub-blocks of a first image that is aligned with a second image. The first image can be the location aligned version of the thin feature image that was generated at block 925 of FIG. 9, and the second image can be the template of the form that was received at block 905 of FIG. 9. This block can be substantially similar to block 1105 of FIG. 11, except that the sub-blocks are determined for the first image.

At block 1310, the computer system selects a sub-block of the first image and a corresponding sub-block of the second image. The corresponding sub-block of the second image can be, e.g., a sub-block comprised of a set of pixels that fall within a boundary of the selected sub-block when the first image is overlaid over the second image. As another example, the corresponding sub-block can be a sub-block comprised of a set of pixels that are at a same location as the pixels of the sub-block of the first image when the first image is overlaid over the second image.

At block 1315, the computer system displaces the sub-block of the first image by a first displacement. In some embodiments, the first displacement is a displacement in one dimension, such as a displacement in the X dimension, or a displacement in the Y dimension (but not a displacement in both dimensions). In other embodiments, the first displacement is a displacement in two dimensions. For example, when the first displacement in a displacement in one dimension, the computer system can displace the sub-block by one pixel in the positive x direction, or by two pixels in the negative x direction, etc. For example, when the first displacement in a displacement in two dimensions, the computer system can displace the sub-block by one pixel in the positive x direction and one pixel in the positive y direction, or by two pixels in the negative x direction and one pixel in the positive y direction, or by three pixels in the positive x direction and zero pixels in the y direction, etc.

At block 1320, the computer system calculates a cross-correlation between the displaced sub-block and the corresponding sub-block. In some embodiments, a correlation is a dot product after a mean is subtracted from each signal, and the cross-correlation is the correlation at each of multiple displacements. In a first example a grid line of the first image is one grid thick, and is misaligned with a corresponding grid line of the second image by one pixel. When the sub-block containing the grid line of the first image is displaced by one pixel such that the grid line of the first image and the grid line of the second image align, the dot product of the two sub-blocks will produce a spike where the two grid lines align. When the sub-block containing the grid line of the first image is displaced by two pixels, the two grid lines will not align, and the cross-correlation of the two sub-blocks will not produce a spike, as the two grid lines do not align. The sub-block of the first image can be displaced within a predetermined one dimensional or two dimensional range, and a dot product can be calculated for each displacement.

In some embodiments, a score is calculated for each of multiple displacements of each sub-block. The computer system then solves a Markov Random Field (MRF) that maximizes an alignment of individual blocks and smoothness with respect to the displacement of neighboring blocks. An OpenGM library, such as the one located at http://hci.iwr.uni-heidelberg.de/opengm2/ (an archive copy of which can be found at https://web.archive.org/web/20151024082917/http://hci.iwr.uni-heidelberg.de/opengm2/) can be leveraged to calculate the MRF. Calculating a MRF is known to those in the art. For example, see http://www.cs.cornell.edu/~rdz/Papers/SZSVKATR.pdf (an archive copy of which is available at https://web.archive.org/web/20151113020857/http://www.cs.cornell.edu/~rdz/Paper s/SZSVKATR.pdf).

In a second example, the sub-block of the first image can be displaced within a predetermined one dimensional or two dimensional range, and a correlation can be calculated for each displacement. The negative of the correlation as can be used as unary terms in a four-connected grid MRF, with a label for each discrete one or two dimensional displacement. For pairwise terms between labels, the Euclidian distance between corresponding displacement vectors can be used, raised to a power, such as the power three. The pairwise cost can weakly penalize many small differences in displacement, and heavily penalize a single large displacement. The MRF model is similar to those used for stereo matching in image processing, such as for computer vision. However, in this application, a search over two dimensional displacements rather than one dimensional displacements can be done, and the pairwise term is better suited for finding an everywhere-smooth mapping, rather than the piecewise-constant or piecewise-smooth labels favored by stereo priors.

One difference between the method of this figure and with stereo matching in computer vision is worth noting. In image processing, a discontinuity can happen when, for example, a person is in the foreground, and the background is a building 100 yards behind the person. When processing the image of the person's face, for example, a discontinuity from the edge of the face to the building 100 yards behind the person is to be expected for computer vision. So a big difference between two neighboring pixels is to be expected and is fine. However, for the method of this figure, a big difference is worse than a small difference. This is because the grid lines have already been fairly closely aligned, so there should be no major displacements. This goes to the reason for the particular pairwise cost that is used in the method of this figure, and why the pairwise cost weakly penalizes many small differences in displacement, and heavily penalizes a single large displacement.

The MRF can be solved with the OpenGM library discussed above, using the AlphaExpansionFusion solver, giving a displacement for each sub-block. The displacement field can be upsampled to the full resolution of the template using Bicubic interpolation. See https://en.wikipedia.org/wiki/Bicubic_interpolation (an archive copy of which is available at https://web.archive.org/web/20150925180553/https://en.wikipedia.org/wiki/Bicubic_interpolation).

At block 1325, the computer system refines an alignment of the first image with the second image based on the calculated cross-correlation. As discussed at block 1320, the sub-block of the first image can be displaced within a predetermined one dimensional or two dimensional range, and a cross-correlation can be calculated for each displacement. When calculating the cross-correlation involves calculating a dot product, as in the first example of block 1320, a spike or maximum in the dot product can indicate that the particular displacement of that calculation improves an alignment of a grid line in the first image and a grid line in the second image. The first image, or a portion of pixels of the first image, can be displaced by the particular displacement amount, or an amount determined based on the particular displacement amount, in order to refine the alignment of the first image and the second image. The portion of the pixels of the first image can be the pixels of the sub-block of the first image.

When calculating a cross-correlation involves calculating a MRF, as in the second example of block 1320, a measure of cross-correlation can be based on the solutions to the MRFs at the various displacements of the sub-block of the first image. The values of the solutions to the MRFs can indicate an improved alignment of a grid line of the first image and a grid line of the second image. Just as above, the first image, or a portion of pixels of the first image, can be displaced by the particular displacement amount, or an amount determined based on the particular displacement amount, in order to refine the alignment of the first image and the second image. For example, when the cross-correlation indicates an improved or optimal alignment between the sub-block of the first image and the corresponding sub-block of the second image, the first image or the portion of the first image can be displaced by the particular displacement amount in order to refine the alignment of the two images.

At block 1330, a determination is made whether each of the sub-blocks have been processed. If no, block 1310 is executed for one of the unprocessed sub-blocks of the first image. If all the sub-blocks have been processed, then block 1335 is next executed. At block 1335, the computer system generates a refined alignment representation of the first image, such as by storing the refined alignment representation to a TIFF, JPEG, etc. image file, or by storing the refined alignment representation at a memory of the computer system.

In some embodiments, the method of FIG. 13 is repeated multiple times, each time with a different algorithm. For example, the method of FIG. 13 can be executed a first time based on a one dimensional displacement of sub-blocks. After this initial refinement is achieved, the method of FIG. 13 can be executed a second time based on a two dimensional displacement of sub-blocks. This can be useful, as the initial one dimensional refinement is less compute intensive than the second two dimensional refinement, and starting the two dimensional refinement with the refined alignment result of the one dimensional alignment reduces the computational expense of running the more computationally expensive two dimensional displacement.

Figure 13B:
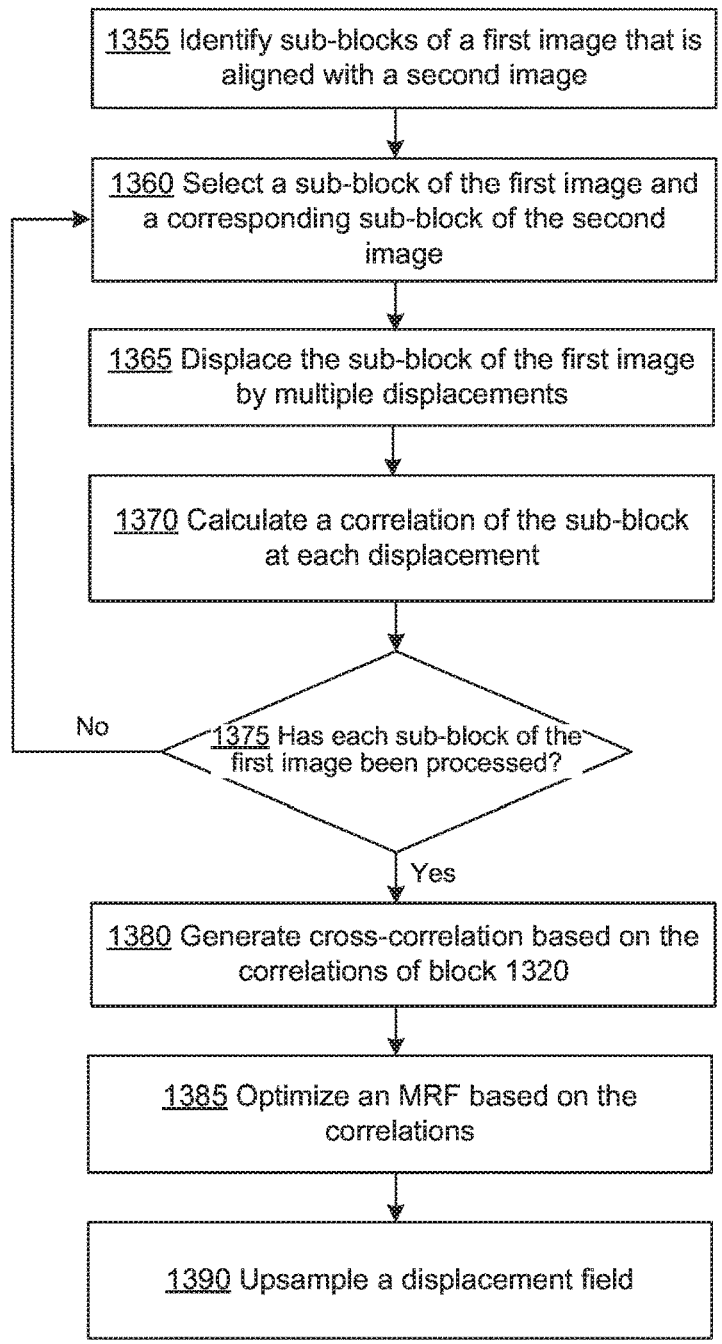

FIG. 13B is a flow diagram that illustrates a second method of refining an alignment of an image of a table of a form with an image of a table of a template of the form, consistent with various embodiments. Blocks 1355-1360 are, respectively, similar to blocks 1305-1310. At block 1365, the computer system displaces the sub-block of the first image by multiple displacements. The displacements can be, e.g., all possible displacements over a displacement range with each displacement limited by a minimum stepping size, a subset of the possible displacements over the range (e.g., multiples of five times the stepping size, multiples of ten times the stepping size, etc.). At block 1370, the computer system calculates a correlation of the sub-block at each displacement. At block 1375, a determination is made whether each of the sub-blocks of the first image has been processed. If no, block 1360 is executed for one of the unprocessed sub-blocks of the first image.

At block 1380, the computer system generates a cross-correlation based on the correlation of block 1370. The cross-correlation can be based on correlations of a subset of all the blocks processed at block 1370, and the subset can be any or all of the blocks processed at block 1370. At block 1385, the computer system optimizes an MRF based on the correlations, such as based on the cross-correlation of block 1380, a subset of the correlations of block 1370, etc. The MRF can be based on the sum of a subset of the correlations of block 1370. For example, the MRF can measure the sums of the subset of the correlations of block 1370. The MRF can also, or instead, be based on the cross-correlation of block 1380. The MRF can further be based on smoothness of displacements of neighboring patches. At block 1390, the computer system up-samples the per-sub-block displacement field and per-pixel displacement field to warp the image of the table.

FIG. 14 is a high-level block diagram showing an example of a processing device 1400 that can represent a system to run any of the methods/algorithms described above, consistent with various embodiments. A system may include two or more processing devices such as represented in FIG. 14, which may be coupled to each other via a network or multiple networks. A network can be referred to as a communication network.

In the illustrated embodiment, the processing device 1400 includes one or more processors 1410, memory 1411, a communication device 1412, and one or more input/output (I/O) devices 1413, all coupled to each other through an interconnect 1414. The interconnect 1414 may be or include one or more conductive traces, buses, point-to-point connections, controllers, adapters and/or other conventional connection devices. Each processor 1410 may be or include, for example, one or more general-purpose programmable microprocessors or microprocessor cores, microcontrollers, application specific integrated circuits (ASICs), programmable gate arrays, or the like, or a combination of such devices. The processor(s) 1410 control the overall operation of the processing device 1400. Memory 1411 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1411 may store data and instructions that configure the processor(s) 1410 to execute operations in accordance with the techniques described above. The communication device 1412 may be or include, for example, an Ethernet adapter, cable modem, Wi-Fi adapter, cellular transceiver, Bluetooth transceiver, or the like, or a combination thereof. Depending on the specific nature and purpose of the processing device 1400, the I/O devices 1413 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for aligning grid lines of an image of a table of a filled-out paper form with grid lines of an image of a table of a template of the filled-out paper form, the method comprising:
  generating, by a computer system, a thin feature image of a filled-out paper form by:
    applying a median filter to an image of a filled-out paper form to generate a filtered image,
      wherein the median filter is configured to eliminate image features below a pre-defined thickness, wherein the pre-defined thickness is based on a thickness of a target grid line;
    subtracting the filtered image of the filled-out paper form from the image of the filled-out paper form to generate the thin feature image,
      wherein the thin feature image includes grid lines of a table of the filled-out paper form;
  straightening, by the computer system, the grid lines of the table by:
    aligning the grid lines of the table with an X axis or a Y axis, the X axis being a horizontal axis and the Y axis being a vertical axis, by:
      for each sub-block of a plurality of sub-blocks of the thin feature image:
        calculating a plurality of Hough transforms for said each sub-block, each of the plurality of Hough transforms being calculated based on a different rotation of said each sub-block relative to the X axis or the Y axis,
        determining a dominant rotation relative to the X axis or the Y axis for said each sub-block based on the plurality of Hough transforms,
        calculating a transformation for said each sub-block based on the dominant rotation, wherein the transformation aligns lines in said each sub-block with the X axis or the Y axis, and
        applying the transformation to generate a rotation aligned version of said each sub-block, and
      generating the rotation aligned version of the thin feature image based on the rotation aligned versions of the plurality of sub-blocks; and
    scaling and shifting, by the computer system, the rotation aligned version of the thin feature image by:
      determining a scale translation and a shift translation that maximizes a correlation between the grid lines of the table of the rotation aligned version of the thin feature image, and template grid lines of an image of a template table of a form template, and
      applying the scale translation and the shift translation to the rotation aligned version of the thin feature image to generate a location aligned version of the thin feature image,
      wherein an alignment of the grid lines of the table of the location aligned version of the thin feature image with the template grid lines of the image of the template table facilitates a determination that the table and the template table are aligned.

2. The method of claim 1, further comprising:
  performing a one dimensional refinement of the alignment by:
    for each pixel of the location aligned version of the thin feature image:
      displacing said each pixel by a first displacement in either a first direction that is parallel with the X axis or a second direction that is parallel with the Y axis, the displacing of the pixel being to a displaced location,
      selecting a pixel of the form template that is at a same position as the displaced location,
      selecting a first value associated with said each pixel,
      selecting a second value associated with the pixel of the form template,
      calculating a third value by performing a mathematical operation that includes the first value and the second value, and
      refining the alignment based on the third value.

3. The method of claim 1, further comprising:
  performing a two dimensional refinement of the alignment by:
    for each pixel of the location aligned version of the thin feature image:
      displacing said each pixel by a first displacement in a first direction that is parallel with the X axis, and a second displacement in a second direction that is parallel with the Y axis, the displacing of the pixel being to a displaced location
      selecting a pixel of the form template that is at a same position as the displaced location,
      selecting a first value associated with said each pixel,
      selecting a second value associated with the pixel of the form template,
      calculating a third value by performing a mathematical operation that includes the first value and the second value, and
      refining the alignment based on the third value.

4. The method of claim 1,
  wherein the calculating the plurality of Hough transforms for said each sub-block includes calculating a squared Hough transform bin for each of the plurality of Hough transforms, and wherein the dominant rotation is determined based on a summing of the squared Hough transform bin for said each of the plurality of Hough transforms.

5. The method of claim 1, wherein the straightening the grid lines of the table further includes calculating and applying a second transformation that linearizes the grid lines of the table.

* * * * *